US012686561B2

(12) United States Patent
Kirkby et al.

(10) Patent No.: US 12,686,561 B2
(45) Date of Patent: Jul. 21, 2026

(54) GRID LEVELLING MECHANISM

(71) Applicant: Ocado Innovation Limited, Hatfield (GB)

(72) Inventors: Oliver Kirkby, Hatfield (GB); Benjamin Arthur Portnoy Noar, Hatfield (GB); Andrew Ingram-Tedd, Hatfield (GB); Stephen Millward, Hatfield (GB); Leslie Wynn, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 505 days.

(21) Appl. No.: 18/041,526

(22) PCT Filed: Aug. 12, 2021

(86) PCT No.: PCT/EP2021/072536
§ 371 (c)(1),
(2) Date: Feb. 13, 2023

(87) PCT Pub. No.: WO2022/034189
PCT Pub. Date: Feb. 17, 2022

(65) Prior Publication Data
US 2023/0303325 A1 Sep. 28, 2023

(30) Foreign Application Priority Data

Aug. 14, 2020 (GB) ...................................... 2012740
Aug. 14, 2020 (GB) ...................................... 2012751
(Continued)

(51) Int. Cl.
*B65G 1/04* (2006.01)
*B65G 1/06* (2006.01)
*E04B 1/24* (2006.01)

(52) U.S. Cl.
CPC ......... *B65G 1/0457* (2013.01); *B65G 1/0464* (2013.01); *B65G 1/0478* (2013.01);
(Continued)

(58) Field of Classification Search
CPC .. B65G 1/0457; B65G 1/0464; B65G 1/0478; B65G 1/065; E04B 1/34363; E04B 5/48;
(Continued)

(56) References Cited

U.S. PATENT DOCUMENTS 3,022,980 A 2/1962 Barker
4,922,670 A * 5/1990 Naka ................. E04F 15/02458
52/126.6
(Continued)

FOREIGN PATENT DOCUMENTS

CA 3080839 A1 5/2019
CN 103612882 A 3/2014
(Continued)

OTHER PUBLICATIONS

First Office Action issued on Feb. 13, 2024, by the Japanese Patent Office in corresponding Japanese Patent Application No. 2023-510417, and an English Translation of the Office Action. (6 pages).
(Continued)

*Primary Examiner* — Theodore V Adamos
(74) *Attorney, Agent, or Firm* — Gregory Matt McCloskey

(57) ABSTRACT

A grid framework structure configured to support one or more load handling devices includes a grid structure including a first set of grid members extending in a first direction and a second set of grid members extending in a second direction, the second set of grid members running transversely to the first set of grid members in a substantially horizontal plane in a grid pattern containing plural grid cells; plural vertical uprights supporting the grid structure; and an
(Continued)

56

64 adjustable grid levelling mechanism for adjusting the level of the grid structure.

17 Claims, 19 Drawing Sheets

(30) Foreign Application Priority Data

| | | | |
|---|---|---|---|
| Sep. 4, 2020 | (GB) | ...................................... | 2013968 |
| Oct. 9, 2020 | (GB) | ...................................... | 2016081 |
| Oct. 9, 2020 | (GB) | ...................................... | 2016097 |

(52) U.S. Cl.
CPC ............ *B65G 1/065* (2013.01); *E04B 1/2403* (2013.01); *E04B 2001/2406* (2013.01); *E04B 2001/2418* (2013.01)

(58) Field of Classification Search
CPC ........... E04B 15/02464; E04B 15/0247; E04B 15/02476; E04B 2001/2406; E04B 2001/2418
See application file for complete search history.

(56) References Cited

U.S. PATENT DOCUMENTS

| | | | | |
|---|---|---|---|---|
| 5,791,096 | A * | 8/1998 | Chen | ................. E04F 15/02452 52/220.1 |
| 6,363,685 | B1 * | 4/2002 | Kugler | .............. E04F 15/02183 52/126.6 |
| 6,442,906 | B1 * | 9/2002 | Hwang | ............... E04F 15/0247 248/188.4 |
| 8,555,579 | B2 * | 10/2013 | Zlatar | ....................... E04B 5/43 52/263 |
| 10,660,438 | B2 | 5/2020 | Hognaland et al. | |
| 2003/0025049 | A1 * | 2/2003 | Huang | ................ E04F 15/0247 248/125.2 |
| 2004/0182025 | A1 | 9/2004 | Moutsokapas et al. | |
| 2006/0003667 | A1 | 1/2006 | Aisenbrey | |
| 2008/0075566 | A1 | 3/2008 | Benedict et al. | |
| 2008/0213073 | A1 | 9/2008 | Benedict et al. | |
| 2010/0205874 | A1 | 8/2010 | Zlatar | |
| 2013/0034409 | A1 * | 2/2013 | Haworth | ............... F16B 43/009 411/546 |
| 2013/0343844 | A1 | 12/2013 | Fosnight et al. | |
| 2016/0145058 | A1 | 5/2016 | Lindbo | |
| 2017/0305668 | A1 | 10/2017 | Bestic et al. | |
| 2017/0355524 | A1 | 12/2017 | Hognaland | |
| 2018/0035625 | A1 | 2/2018 | Lindbo et al. | |
| 2018/0037411 | A1 | 2/2018 | Lindbo et al. | |
| 2018/0044110 | A1 | 2/2018 | Clarke et al. | |
| 2018/0044111 | A1 | 2/2018 | Clarke et al. | |
| 2018/0050869 | A1 | 2/2018 | Lindbo et al. | |
| 2018/0051459 | A1 | 2/2018 | Clarke et al. | |
| 2018/0086559 | A1 | 3/2018 | Lindbo et al. | |
| 2018/0086573 | A1 | 3/2018 | Lindbo | |
| 2018/0093828 | A1 | 4/2018 | Lindbo et al. | |
| 2018/0148259 | A1 * | 5/2018 | Gravelle | .................. B65G 1/04 |
| 2018/0160150 | A1 | 6/2018 | Wu et al. | |
| 2018/0194571 | A1 | 7/2018 | Fryer et al. | |
| 2018/0237221 | A1 | 8/2018 | Lindbo et al. | |
| 2019/0019707 | A1 | 1/2019 | Suzuki | |
| 2019/0161273 | A1 | 5/2019 | Ingram-Tedd et al. | |
| 2019/0233213 | A1 | 8/2019 | Phan-Quiroga et al. | |
| 2019/0239640 | A1 | 8/2019 | Lert et al. | |
| 2019/0241362 | A1 | 8/2019 | Lindbo et al. | |
| 2020/0042563 | A1 | 2/2020 | Hognaland | |
| 2020/0130934 | A1 | 4/2020 | Clarke et al. | |
| 2020/0140196 | A1 | 5/2020 | Clarke et al. | |
| 2020/0148471 | A1 | 5/2020 | Lindbo et al. | |
| 2020/0208395 | A1 | 7/2020 | Hall et al. | |
| 2020/0231381 | A1 | 7/2020 | Lindbo et al. | |
| 2020/0318338 | A1 | 10/2020 | Austrheim | |
| 2020/0343118 | A1 | 10/2020 | Torazawa et al. | |
| 2020/0361707 | A1 | 11/2020 | Lindbo et al. | |
| 2020/0391942 | A1 | 12/2020 | Lindbo et al. | |
| 2021/0169219 | A1 | 6/2021 | Lert et al. | |
| 2021/0179355 | A1 | 6/2021 | Heggebø et al. | |
| 2021/0309459 | A1 | 10/2021 | Clarke et al. | |
| 2023/0303323 | A1 | 9/2023 | Millward et al. | |
| 2023/0303326 | A1 | 9/2023 | Cogley et al. | |
| 2023/0303327 | A1 | 9/2023 | Malinowski et al. | |
| 2024/0010425 | A1 | 1/2024 | Noar et al. | |

FOREIGN PATENT DOCUMENTS

| | | | | |
|---|---|---|---|---|
| CN | 111139939 | A | 5/2020 | |
| CN | 211365948 | U | 8/2020 | |
| CN | 109230155 | B | 2/2021 | |
| DE | 202013007058 | U1 | 11/2014 | |
| DE | 202018105531 | U1 * | 11/2018 | .......... E04F 15/0247 |
| EP | 0081960 | A1 * | 6/1983 | ........ E04F 15/02464 |
| EP | 1116683 | A1 | 7/2001 | |
| EP | 3017932 | A1 | 5/2016 | |
| GB | 2012740 | A | 8/1979 | |
| GB | 2013968 | A | 8/1979 | |
| GB | 2016081 | A | 9/1979 | |
| GB | 2016097 | A | 9/1979 | |
| GB | 2554109 | A | 3/2018 | |
| GB | 2594559 | A | 11/2021 | |
| GB | 2594560 | A | 11/2021 | |
| JP | 3025818 | B2 | 6/1996 | |
| JP | 2000233812 | A | 8/2000 | |
| JP | 2003253797 | A | 9/2003 | |
| JP | 2004091095 | A | 3/2004 | |
| JP | 2019507714 | A | 3/2019 | |
| JP | 2020519551 | A | 7/2020 | |
| JP | 2023512658 | A | 3/2023 | |
| NO | 343387 | B1 | 2/2019 | |
| NO | 20200118 | A1 | 8/2021 | |
| WO | 2014195901 | A1 | 12/2014 | |
| WO | 2015019055 | A1 | 2/2015 | |
| WO | 2015185628 | A2 | 12/2015 | |
| WO | 2016029205 | A1 | 2/2016 | |
| WO | 2016063197 | A1 | 4/2016 | |
| WO | 2016166294 | A1 | 10/2016 | |
| WO | 2016172793 | A1 | 11/2016 | |
| WO | 2016193767 | A1 | 12/2016 | |
| WO | 2017081281 | A1 | 5/2017 | |
| WO | 2017122150 | A1 | 7/2017 | |
| WO | 2017153583 | A1 | 9/2017 | |
| WO | 2017220651 | A1 | 12/2017 | |
| WO | 2018049441 | A1 | 3/2018 | |
| WO | 2018146304 | A1 | 8/2018 | |
| WO | 2018210952 | A1 | 11/2018 | |
| WO | 2019032651 | A1 | 2/2019 | |
| WO | 2019087618 | A1 | 5/2019 | |
| WO | 2019094511 | A1 | 5/2019 | |
| WO | 2019101367 | A1 | 5/2019 | |
| WO | 2019101725 | A1 | 5/2019 | |
| WO | 2019157197 | A1 | 8/2019 | |
| WO | 2019238702 | A1 | 12/2019 | |
| WO | WO-2020046227 | A2 * | 3/2020 | ........ E04F 15/02464 |
| WO | 2020074257 | A1 | 4/2020 | |
| WO | 2020092149 | A1 | 5/2020 | |
| WO | 2020094339 | A1 | 5/2020 | |
| WO | 2020224828 | A1 | 11/2020 | |
| WO | 2021152170 | A1 | 8/2021 | |
| WO | 2021175873 | A1 | 9/2021 | |
| WO | 2022048973 | A1 | 3/2022 | |

OTHER PUBLICATIONS

First Office Action issued on Feb. 13, 2024, by the Japanese Patent Office in corresponding Japanese Patent Application No. 2023-510419, and an English Translation of the Office Action. (8 pages).
First Office Action issued on Mar. 19, 2024, by the Japanese Patent Office in corresponding Japanese Patent Application No. 2023-510421, and an English Translation of the Office Action. (10 pages).

(56)  References Cited

OTHER PUBLICATIONS

Office Action (Examination Report No. 1) issued on Apr. 17, 2024, by the Australian Patent Office in corresponding Australian Patent Application No. 2021325368. (4 pages).

Office Action (Examination Report No. 1) issued on Apr. 4, 2024, by the Australian Patent Office in corresponding Australian Patent Application No. 2021324116. (4 pages).

Office Action (Examination Report No. 1) issued on Jan. 30, 2024, by the Australian Patent Office in corresponding Australian Patent Application No. 2021325729. (4 pages).

Office Action (Examination Report No. 1) issued on Mar. 22, 2024, by the Australian Patent Office in corresponding Australian Patent Application No. 2021324385. (4 pages).

Office Action (Examination Report No. 1) issued on Jan. 15, 2024, by the Australian Patent Office in corresponding Australian Patent Application No. 2021325730. (4 pages).

Office Action (Examination Report No. 1) issued on Jun. 7, 2024, by the Australian Patent Office in corresponding Australian Patent Application No. 2021399015. (4 pages).

Office Action issued on Jun. 27, 2024, by the Canadian Patent Office in corresponding Canadian Patent Application No. 3, 190,648. (6 pages).

Office Action issued on Jun. 28, 2024, by the Canadian Patent Office in corresponding Canadian Patent Application No. 3, 190,629. (5 pages).

First Office Action issued on Apr. 16, 2024, by the Japanese Patent Office in corresponding Japanese Patent Application No. 2023-510416, and an English Translation of the Office Action. (8 pages).

Office Action issued on Dec. 30, 2024, by the U.S. Patent and Trademark Office in co-pending U.S. Appl. No. 18/041,530. (12 pages).

International Search Report (PCT/ISA/210) and Written Opinion (PCT/ISA/237) mailed on Nov. 11, 2021, by the European Patent Office as the International Searching Authority for International Application No. PCT/EP2021/072532. (20 pages).

International Search Report (PCT/ISA/210) and Written Opinion (PCT/ISA/237) mailed on Nov. 12, 2021, by the European Patent Office as the International Searching Authority for International Application No. PCT/EP2021/072547. (20 pages).

International Search Report (PCT/ISA/210) and Written Opinion (PCT/ISA/237) mailed on Nov. 5, 2021, by the European Patent Office as the International Searching Authority for International Application No. PCT/EP2021/072538. (12 pages).

International Search Report (PCT/ISA/210) and Written Opinion (PCT/ISA/237) mailed on Nov. 8, 2021, by the European Patent Office as the International Searching Authority for International Application No. PCT/EP2021/072536. (13 pages).

Patents Act 1977: Combined Search and Examination Report under Sections 17 and 18(3) dated Feb. 4, 2022, issued by the United Kingdom Intellectual Property Office in Application No. GB2111578. 7. (3 pages).

Patents Act 1977: Combined Search and Examination Report under Sections 17 and 18(3) dated Feb. 4, 2022, issued by the United Kingdom Intellectual Property Office in Application No. GB2111587. 8. (2 pages).

Patents Act 1977: Combined Search and Examination Report under Sections 17 dated Feb. 8, 2022, issued by the United Kingdom Intellectual Property Office in Application No. GB2111607.4. (9 pages).

Patents Act 1977: Examination Report under Sections 18(3) dated Nov. 9, 2022, issued by the United Kingdom Intellectual Property Office in Application No. GB2111607.4. (5 pages).

Patents Act 1977: Search Report under Sections 17 dated Dec. 14, 2021, issued by the United Kingdom Intellectual Property Office in Application No. GB2109567.4. (1 page).

Patents Action 1977: Combined Search and Examination Report under Section 17 & 18(3) dated Feb. 4, 2022, issued by the United Kingdom Intellectual Property Office in Application No. GB2111597. 7. (4 pages).

Patents Action 1977: Combined Search and Examination Report under Section 17 and 18(3) dated Feb. 8, 2023, issued by the United Kingdom Intellectual Property Office in Application No. GB2218269. 5. (5 pages).

Patents Action 1977: Combined Search and Examination Report under Sections 17 & 18(3) dated Feb. 4, 2022, issued by the United Kingdom Intellectual Property Office in Application No. GB2111582. 9. (5 pages).

Patents Action 1977: Search Report under Section 17 dated Feb. 1, 2022, issued by the United Kingdom Intellectual Property Office in Application No. GB2111587.8. (1 page).

Patents Action 1977: Search Report under Section 17 dated Feb. 3, 2022, issued by the United Kingdom Intellectual Property Office in Application No. GB2111578.7. (2 pages).

Patents Action 1977: Search Report under Section 17(5) dated Feb. 15, 2021, issued by the United Kingdom Intellectual Property Office in Application No. GB2012751.0. (4 pages).

Patents Action 1977: Search Report under Section 17(5) dated Feb. 7, 2021, issued by the United Kingdom Intellectual Property Office in Application No. GB2012740.3. (3 pages).

Patents Action 1977: Search Report under Section 17(5) dated Jun. 16, 2021, issued by the United Kingdom Intellectual Property Office in Application No. GB2016081.8. (3 pages).

Patents Action 1977: Search Report under Section 17(5) dated May 20, 2021, issued by the United Kingdom Intellectual Property Office in Application No. GB2016097.4. (4 pages).

International Search Report (PCT/ISA/210) and Written Opinion (PCT/ISA/237) mailed on Nov. 30, 2021, by the European Patent Office as the International Searching Authority for International Application No. PCT/EP2021/072539. (14 pages).

Office Action issued on Jun. 3, 2024, by the Canadian Patent Office in corresponding Canadian Patent Application No. 3,191,155. (8 pages).

Office Action issued on Jun. 3, 2024, by the Canadian Patent Office in corresponding Canadian Patent Application No. 3,191,324. (4 pages).

Office Action issued on Jun. 4, 2024, by the Canadian Patent Office in corresponding Canadian Patent Application No. 3,190,958. (4 pages).

The extended European Search Report issued on Jun. 14, 2024, by the European Patent Office in corresponding European Application No. 24164309.7. (11 pages).

Office Action issued on Mar. 13, 2025 by the Korean Patent Office in corresponding Korean Application No. 10-2023-7008102 (8 pages) corresponding to Applicant's United States U.S. Appl. No. 18/041,526.

Office Action issued on Jul. 9, 2025 by the Chinese Patent Office in corresponding Chinese Application No. 202180070369.8 (9 pages) corresponding to Applicant's U.S. Appl. No. 18/041,526.

Office Action issued on Mar. 17, 2026 by the Chinese Patent Office in corresponding Chinese Application No. 202180070369.8 (18 pages) corresponding to Applicant's U.S. Appl. No. 18/041,526.

* cited by examiner

GRID LEVELLING MECHANISM

FIELD OF INVENTION

The present invention relates to the field of remotely operated load handling devices on tracks located on a grid framework structure for handling storage containers or bins stacked in the grid framework structure, more specifically to a grid framework structure for supporting the remotely operated load handling devices.

BACKGROUND

Storage systems 1 comprising a three-dimensional storage grid framework structure, within which storage containers/bins are stacked on top of each other, are well known. PCT Publication No. WO2015/185628A (Ocado) describes a known storage and fulfilment or distribution system in which stacks of bins or containers are arranged within a grid framework structure. The bins or containers are accessed by load handling devices remotely operative on tracks located on the top of the grid framework structure. A system of this type is illustrated schematically in FIGS. 1 to 3 of the accompanying drawings.

As shown in FIGS. 1 and 2, stackable containers, known as storage bins or containers 10, are stacked on top of one another to form stacks 12. The stacks 12 are arranged in a grid framework structure 14 in a warehousing or manufacturing environment. The grid framework is made up of a plurality of storage columns or grid columns. Each grid in the grid framework structure has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

In detail, the grid framework structure 14 comprises a plurality of vertical uprights or upright members or upright columns 16 that support horizontal grid members 18, 20. A first set of parallel horizontal grid members 18 is arranged perpendicularly to a second set of parallel horizontal grid members 20 to form a grid structure or grid 15 comprising a plurality of grid cells 17. The grid cell has an opening to allow a load handling device to lift a container or storage bin through the grid cell. In the grid structure, the first set of parallel horizontal grid members 18 intersect the second set of parallel horizontal grid members at nodes. The grid structure is supported by the upright members 16 at each of the nodes or at the point where the grid members intersect such that the upright members are interconnected at their tops ends by the intersecting grid members. The grid members 16, 18, 20 are typically manufactured from metal and typically welded or bolted together or a combination of both. The storage bins or containers 10 are stacked between the upright members 16 of the grid framework structure 14, so that the upright members 16 guards against horizontal movement of the stacks 12 of bins 10, and guides vertical movement of the storage bins 10.

The top level of the grid framework structure 14 includes rails 22 arranged in a grid pattern across the top of the stacks 12. Referring additionally to FIG. 3, the rails 22 support a plurality of load handling devices 30. A first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device otherwise known as a bot 30 shown in FIGS. 4 and 5 comprising a vehicle body 32 is described in PCT Patent Publication No. WO2015/019055 (Ocado), hereby incorporated by reference, where each load handling device 30 only covers a single grid space or grid cell of the grid framework structure 14. Here, the load handling device 30 comprises a wheel assembly comprising a first set of wheels 34 consisting a pair of wheels on the front of the vehicle body 32 and a pair of wheels 34 on the back of the vehicle 32 for engaging with the first set of rails or tracks to guide movement of the device in a first direction and a second set of wheels 36 consisting of a pair of wheels 36 on each side of the vehicle 32 for engaging with the second set of rails or tracks to guide movement of the device in a second direction. Each of the set wheels are driven to enable movement of the vehicle in X and Y directions respectively along the rails. One or both sets of wheels can be moved vertically to lift each set of wheels clear of the respective rails, thereby allowing the vehicle to move in the desired direction, e.g. X or Y direction on the grid structure.

The load handling device 30 is equipped with a lifting device or crane mechanism to lift a storage container from above. The crane mechanism comprises a winch tether or cable 38 wound on a spool or reel (not shown) and a grabber device 39 in the form of a lifting frame. The lifting device comprise a set of lifting tethers 38 extending in a vertical direction and connected nearby or at the four corners of the lifting frame 39, otherwise known as the grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess 40, in the lower part. The recess is sized to accommodate the container 10 when it is lifted by the crane mechanism, as shown in FIG. 5 (a and b). When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device. The container receiving space may comprise a cavity or recess arranged within the vehicle body, e.g. as described in WO 2015/019055 (Ocado Innovation Limited). Alternatively, the vehicle body of the load handling device may comprise a cantilever as taught in WO2019/238702 (Autostore Technology AS) in which case the container receiving space is located below a cantilever of the load handing device. In this case, the grabber device is hoisted by a cantilever such that the grabber device is able to engage and lift a container from a stack into a container receiving space below the cantilever.

To erect the grid framework structure in the art, a plurality of vertical uprights are individually positioned in a grid-like pattern on the ground. A sub-group of the vertical uprights are braced together to provide structural stability to the grid framework structure. The vertical uprights are interconnected at their top ends by grid members so that the grid members adopt the same grid pattern as the vertical uprights, i.e. the vertical uprights support the grid members at the points where the grid members intersect in the grid pattern. For the purpose of explanation of the present invention, the points or junctions where the grid members intersect or are interconnected constitute the nodes of the grid structure and correspond to the area where the grid structure is supported by a vertical upright. The resultant grid framework structure can be considered as a free standing rectilinear assemblage of upright columns supporting the grid formed from intersecting horizontal grid members, i.e. a four wall shaped framework. As one or more load handling devices are operative on the grid structure, it is paramount that the grid structure lies in a substantially horizontal plane as this will affect the direction in which the containers or storage bins are hoisted into the correct position through a grid cell. If the level of the grid structure deviates from the horizontal plane, this will not only put a strain on the one or more load handling devices travelling on the grid structure, but also will cause the lifting tethers to sway to one side depending on the direction of the deviation, and in a worst case scenario, cause the grabber device to fail to engage with the container or storage bin below. The problem is exacerbated when the floor on which the grid framework structure is installed is uneven. Traditionally, the level of the grid structure mounted on the vertical uprights is adjusted by having an adjustable levelling foot at the base or lower end of the vertical uprights to compensate for an uneven floor. The level of the grid structure is adjusted by tentatively adjusting the adjustable levelling foot at the base of one or more vertical uprights in a grid framework structure and checking the level of the grid structure at the top of the grid structure each time an adjustment is made, e.g. by use of a suitable levelling measurement instrument such as a laser level commonly known in the art. In a majority of cases, this requires the use of specialist tooling to rotate a threaded shaft to allow the height of the adjustable levelling foot to be varied. However, the problem with this approach is the separation between the adjustable foot and the grid structure, which can be in excess of 21 containers or storage bins high, would make incremental adjustments to the level of the grid structure at the uppermost level laborious and time consuming due to this separation. Moreover, given the weight and the changeable forces to which the grid framework structure is continuously subjected to during its operation, the initially level grid structure may become uneven over time, requiring the level of the grid structure to be periodically adjusted. This requires a user to identify the area of unevenness in the grid structure and to adjust the base of the grid framework structure, which involves adjusting one or more adjustable levelling feet at the base of one or more vertical uprights and periodically inspecting the level of the grid structure on top. The time and effort to periodically inspect the level of the grid structure at the top of the structure and adjust the adjustable levelling feet at the base of the grid framework structure becomes a problem as the inspection of the level of the grid is not truly being carried out in real time where the adjustments are being made.

U.S. Pat. No. 10,660,438 (Autostore Technology AS) has attempted to mitigate this problem by providing a self-adjusting levelling foot comprising a base having a raised, hollow column. A spring is arranged in the hollow column. A moveable top piece engages the column, and is movable in the vertical direction against the force of the spring. The top piece is slightly larger than the column, such that side walls of the top piece overlap the sides of the column when the spring is compressed. The bottom edges of the side walls of the top piece are angled. A generally U-shaped wedge device is provided that may be pressed into engagement with the base, whereby a leg of the U engages each side of the column. The top surfaces of the legs of the U-shaped device are angled in the form of wedges, the angles of the top surfaces of the legs corresponding to the angles of the side walls of the movable top piece. In that manner, the side walls of the top piece will rest upon the angled top surfaces of the legs of the wedge device when the top piece is under load. However, the problem with this grid levelling mechanism is that in the event that the floor were to sink, it would be necessary that the U-shaped wedge device be pressed further forward to achieve a stable base of the support. Again, this requires measurement of the grid level at the top.

An adjustable grid levelling mechanism is thus required that allows the level of the grid structure to be adjusted easily when monitored.

This application claims priority from GB patent application numbers GB2012740.3 filed 14 Aug. 2020, GB2012751.0 filed 14 Aug. 2020, GB2013968.9 filed 4 Sep. 2020, GB2016081.8 filed 9 Oct. 2020, and GB2016097.4 filed 9 Oct. 2020, the contents being herein incorporated by reference.

SUMMARY OF INVENTION

The present invention has mitigated the above problem by transferring the adjustable grid levelling mechanism to the point where the measurements of the grid level are taken, such that adjustments of the grid level can be made in real time or contemporaneously as the grid level is measured. More specifically, the present invention provides a grid framework structure configured to support one or more load handling devices thereupon, said grid framework structure comprising:

i) a grid structure comprising a first set of grid members extending in a first direction and a second set of grid members extending in a second direction, the second set of grid members running transversely to the first set of grid members in a substantially horizontal plane in a grid pattern comprising a plurality of grid cells;

ii) a plurality of vertical uprights for supporting the grid structure;

iii) an adjustable grid levelling mechanism for adjusting the level of the grid structure;

characterised in that:

the adjustable grid levelling mechanism is interposed between at least one of the plurality of vertical uprights and the grid structure for adjusting a vertical distance between the at least one of the plurality of vertical uprights and the grid structure.

By interposing the adjustable grid levelling mechanism between the at least one of the plurality of vertical uprights and the grid structure, the measurement and operation of the adjustable grid levelling mechanism can be done from the same position. This has the advantage that fewer operators are needed to measure and adjust the grid level. As a result, the adjustments of the grid level can be made in real time as opposed to measuring the grid level first and then subsequently making the necessary adjustments, which might not be precise, requiring further adjustments to be made at the foot the vertical uprights. Another advantage of mounting the grid structure on the adjustable grid levelling mechanism is that the components of the adjustable grid levelling mechanism, in particular the extendible section, do not have to bear the full weight of the vertical uprights, since the adjustable grid levelling mechanism is transferred to the upper end of the vertical uprights. This provides the grid framework structure with greater flexibility to anchor the lower end of the vertical uprights on a more substantial foot that provides more lateral stability that can be provided by the adjustable grid levelling mechanism alone. For the purpose of the present invention, the grid level represents the orientation of the grid structure in the horizontal plane. By adjusting the height at one or more areas of the grid structure, the orientation of the grid structure in the horizontal plane is adjusted.

Any section or portion of the grid structure can be mounted to the vertical uprights. For example, a section of the grid structure comprising four adjoined grid cells can be supported by five or fewer vertical uprights. For the purpose of the present invention, the term "adjoined" in the context of the grid structure is limited to a collection of four adjacent grid cells, i.e. each of the grid cells in the section are directly adjacent to each other. In the present invention, a section of or at least a portion of the grid structure comprising four adjoined grid cells is supported by five or fewer vertical uprights. The section of four adjoined grid cells can be anywhere within the grid structure. Preferably, the section of the grid structure comprises a corner section of the grid structure. Optionally, the plurality of vertical uprights are arranged to form a plurality of vertical storage locations for one or more containers to be stacked between the upright columns and be guided by the upright column in a vertical direction. More preferably, the plurality of vertical uprights are interconnected at their top ends by the first set of grid members and the second set of grid members such that the grid structure is mounted to the adjustable grid levelling mechanism at one or more of the interconnections of the plurality of vertical uprights.

Preferably, the adjustable grid levelling mechanism comprises a base for mounting to the top or upper end of the vertical upright, a mounting head for the grid structure to be mounted thereon, and an extendible section interposed between the base and the mounting head such that the mounting head is moveable relative to the base. Optionally, the base comprises an insert receivable in an upper end of the vertical upright. Generally, each of the vertical uprights is tubular. In transverse cross-section in the horizontal plane, each of the vertical uprights comprises a hollow centre section (typically a box section) with one or more guides mounted to or formed at the corners of the hollow centre section that extends along the longitudinal length of the vertical upright for guiding the movement of the containers along the vertical upright. Preferably, the insert is shaped to be received in the box section at the upper end of the vertical upright.

In one embodiment of the present invention, the extendible section comprises a threaded shaft that can be extended or retracted relative to the base. Optionally, the mounting head is mounted to the threaded shaft that threadingly engages with the base such that the threaded shaft can be extended or retracted relative to the base. The base comprises a thread hole for threadingly engaging with the threaded shaft. Thus, by rotating the threaded shaft about the longitudinal axis of the vertical upright, the height of the mounting head relative to the base can be adjusted. The threaded shaft threadingly engages with one or more threaded nuts to assist with the rotation of the thread shaft relative to the base.

Instead of providing a threaded shaft that can be extended or retracted to alter the height of the extendible section, in an alternative embodiment of the present invention the extendible section comprises a pair of mating washers having opposing faces or mating faces. The opposing faces or mating faces of each of the pair of mating washers have a profile or contour with a variable height extending in or around the circumferential direction such that rotation of the at least one of the pair of mating washers relative to the other causes the height of the pair of the mating washers to be adjusted. For the purpose of the present invention, the term "washer" is construed to include any shape of plate or body with a hole (typically in the middle) that is normally used to distribute the load across the washer. Preferably, the washer is an annular plate or body. The advantage of the washers over a threaded shaft to adjust the height and thus level of the grid structure is that the threads of the shaft which tend to bear the full weight of the grid structure and one or more load handling devices operative on the grid structure may become worn over time. This results in the threaded shaft cross threading with the base, in particular the insert, removing its ability to adjust its height, i.e. move in a vertical direction. Such a vulnerability is not present where the extendible section comprises a pair of mating washers as the mating faces of the washers are more robust and the load is distributed or spread across a greater surface area of the mating faces of the washers rather than the threads of a shaft. To adjust the height of the pair of mating washers and thus the level of the grid structure, the mating face of each of the pair of mating washers has a profile or contour with a variable height extending in or around the circumferential direction of the pair of mating washers such that rotation of at least one of the pair of mating washers relative to the other causes the height of the pair of the mating washers to be adjusted. In use, at least one of the pair of washer rotates about the longitudinal axis of the vertical upright. Optionally, the profile or contour of the mating face of at least one of the pair of mating washers is wedge shaped. The angle that the wedge shaped face makes with the underside of the mating washer controls the height adjustment of the pair of washers, and thus, the degree of adjustment of the level of the grid structure. A more steeply inclined wedge shape provides a coarser adjustment of height. Conversely, a gentler inclined wedge shape provides a finer adjustment of the height.

To lock the rotation of one of the pair of mating washers relative to the other mating washer at a desired rotational angle and thus a desired height of the pair of mating washers, preferably the mating faces of the pair of mating washers comprise engagement features that engage with each other during rotation of at least one of the pair of mating washers relative to the other. Preferably, the mating faces of the pair of mating washers comprise indexing means or an indexing mechanism such that rotation of the at least one washer relative to the other washer is indexed. The indexing means or indexing mechanism provides a ratchet mechanism whereby the at least one of the pair of mating washers is able to rotate about the longitudinal axis of the vertical upright in one direction but is prevented from rotating in the other direction. For example, the indexing means or an indexing mechanism allows the at least one of the pair of mating washers to rotate in an anti-clockwise direction about the longitudinal axis of the vertical upright to increase the height of the pair of mating washers, but is prevented from rotating in a clockwise direction, thereby locking the rotation of the pair of mating washers at a desired height. Optionally, the indexing means or indexing mechanism comprises a plurality of wedge faces. More preferably, the mating faces of the pair of mating washers comprise a plurality of wedge faces or teeth that ride over each other to lock the rotation of the pair of mating washers when at least one of the pair of mating washers rotates relative to the other of the pair of mating washers. To release the lock and thereby allow the height of the pair of mating washers to reduce, the pair of mating washers can be forcibly separated to disengage the plurality of wedge faces or teeth.

Preferably, the base comprises a seat for seating the pair of mating washers. More preferably, the seat comprises a post arranged to receive the pair of mating washers. Optionally, the mounting head comprises a spigot receivable in the seat. Optionally, the mounting head comprises four perpendicular ends, each of the four perpendicular ends being configured for connecting to at least one of the first set of grid members extending in the first direction and at least one of the second set of grid members extending in the second direction.

The ability to adjust the level of the grid structure at the upper end of one or more vertical uprights where they interconnect with the first and second set of grid members, allows the lower end or the foot of the vertical uprights to be anchored to a concrete foundation by a more stable anchor foot that can bear the weight of the grid framework structure. The anchor foot can be anchored to the concrete foundation by one or more bolts. Different types of anchor feet can be used to provide lateral stability to the grid framework structure. For example, the anchor foot can be topology optimised to optimise the material layout within a given design space for a given set of loads. Loads considered in the topology optimisation of the anchor foot are the loads from the vertical uprights and loads as a result of bracing members connecting the vertical uprights.

Optionally, in addition to adjusting the level of the grid structure at the upper end of one or more vertical uprights, the adjustments can be made at the lower end or foot of the vertical uprights. Optionally, the anchor foot is extendible and can be extended or retracted to adjust the height of the anchor foot and thus the level of the grid structure. This allows coarser adjustments of the grid level to be made at the foot of one or more vertical uprights and finer adjustments to the level or tuning of the grid structure to be made at the upper end of the vertical uprights where the level of the grid structure is measured.

Optionally, the first set of grid members comprises a first set of tracks and the second set of grid members comprises a second set of tracks. Optionally, the first set of grid members comprises a first set of track supports and the second set of grid members comprises a second set of track supports. Optionally, the first set of tracks are snap fitted to the first set of track supports and the second set of tracks are snapped fitted to the second set of track supports. Equally plausible in the present invention is that the plurality of tracks can be integrated into the first and second set of track supports such that the grid members of the grid structure comprise both the tracks and the track supports.

DESCRIPTION OF DRAWINGS

Further features and aspects of the present invention will be apparent from the following detailed description of an illustrative embodiment made with reference to the drawings, in which:

FIG. 16 is a perspective view of the adjustable grid levelling mechanism interposed between a portion of the grid structure and the vertical upright according to the first embodiment of the present invention.

FIG. 17 is a perspective view of an adjustable grid levelling mechanism according to a second embodiment of the present invention in (a) retracted configuration; and (b) extended configuration.

DETAILED DESCRIPTION

Figure 6:
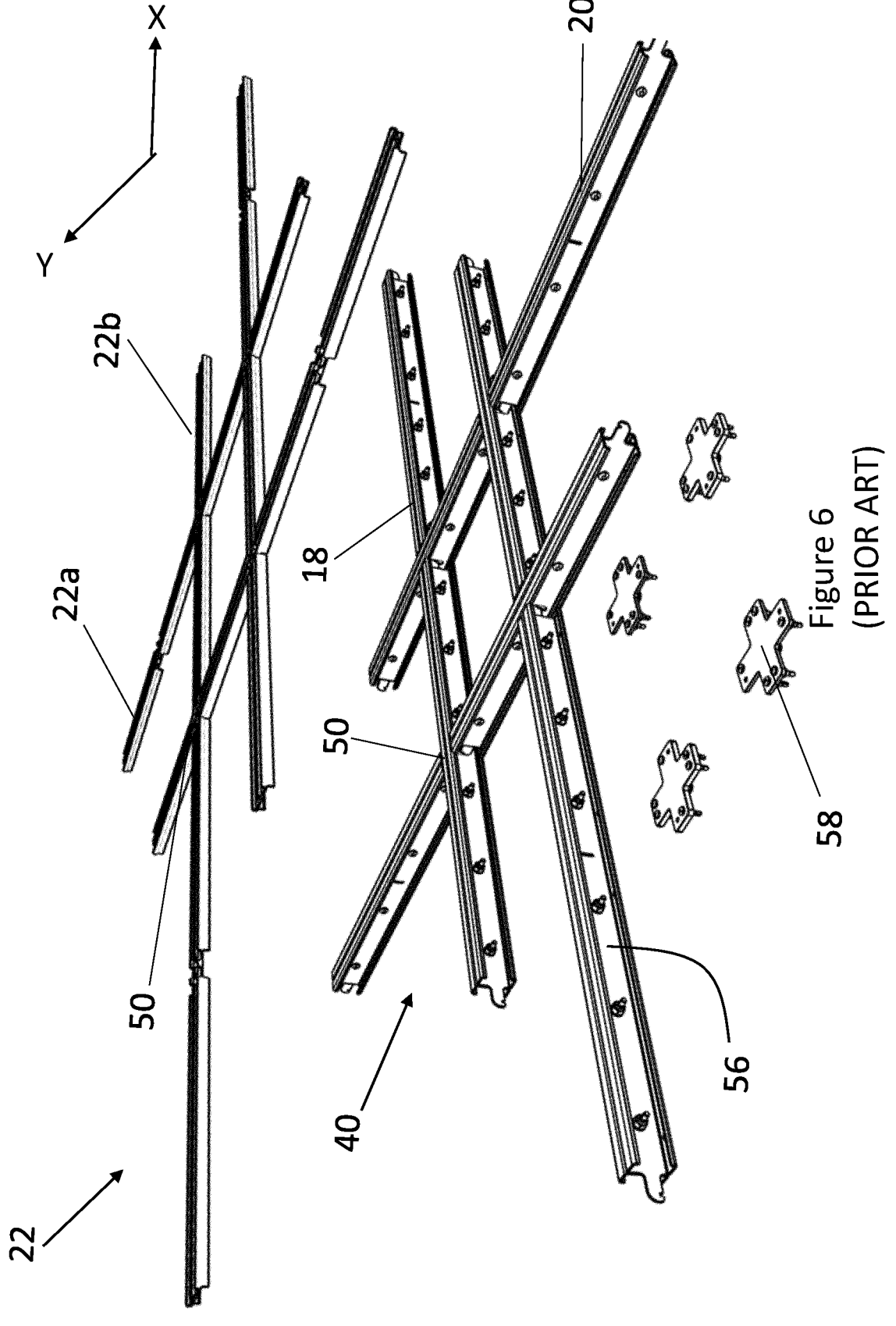
FIG. 6 is a perspective view showing the arrangement of the tracks and track supports interconnected at their nodes or intersections by a cap plate.

It is against the known features of the storage system such as the grid framework structure and the load handling device described above with reference to FIGS. 1 to 5, that the present invention has been devised. As shown in FIG. 6, a grid structure 40 for guiding the movement of one or more load handling devices comprises a first set of parallel grid members extending in a first direction and a second set of parallel grid members extending in a second direction, the first direction being substantially perpendicular to the second direction to form a plurality of rectangular or square frames constituting grid cells. More specifically a first a set of grid members extend in a first direction and a second set of grid members extend in a second direction, the second set of grid members running transversely to the first set of grid members in a substantially horizontal plane, i.e. the grid structure is represented by Cartesian coordinates in the X and Y direction. Each of the grid members can comprise a track support 18, 20 and/or a track or rail 22a, 22b whereby the track or rail 22a, 22b is mounted to the track support 18, 20. A load handling device is operative to move along the track or rail 22a, 22b of the present invention. Alternatively, the track 18, 20 can be integrated into the track support 18, 20 as a single body, e.g. by extrusion. In the particular embodiment of the present invention, the grid member comprises a track support 18, 20 and a track 22a, 22b whereby the track or rail 22a, 22b is mounted to the track support 18, 20.

Typically, at least one grid member in a set, e.g. a single grid member, can be sub-divided or sectioned into discrete grid elements that can be joined or linked together to form a grid member extending in the first direction or in the second direction. Where the grid members comprise a track support 18, 20, the track support can also be sub-divided into discrete track support elements that are linked together to form the track support. The discrete track support elements making up a track support extending in the first axial direction and in the second axial direction are shown in FIG. 6. An individual track support element 56 used to make up a track support 18, 20 is shown in FIG. 6. The track support 18, 20 in transverse cross section can be a solid support of C-shaped or U-shaped or I shaped cross section or even double-C or double-U shaped support. In the particular embodiment of the present invention, the track support element 56 comprises double back-to-back C sections bolted together.

Figure 8:
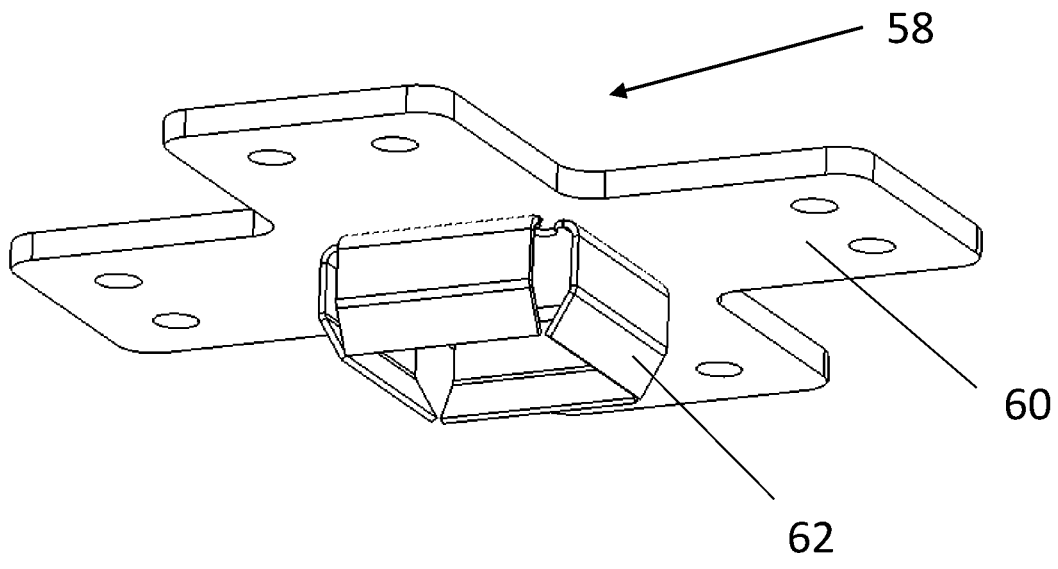
FIG. 8 is a perspective view of a cap plate for interconnecting the vertical uprights to the grid members at the nodes.

A connection plate or cap plate 58 as shown in FIG. 6 and FIG. 8 can be used to link or join the individual track support elements 56 together in both the first and the second direction at the junction where multiple track support elements cross in the grid structure 40, i.e. the cap plate 58 is used to connect the track support elements 56 together to vertical uprights 16. As a result, the vertical uprights 16 are interconnected at their upper ends at the junction where the multiple track support elements cross in the grid structure 40 by the cap plate 58, i.e. the cap plate is located at the node 50 of the grid structure 40. For the purpose of explanation of the present invention, the points or areas where the grid members intersect or cross as shown in FIG. 6 can be defined as nodes or intersections 50. It is clearly apparent from the layout of at least a portion or section of a known grid structure 40 constituting a single grid cell 42 shown in FIG. 6 that each intersection or node 50 of the grid structure 40 is supported by a vertical upright 16.

Figure 7:
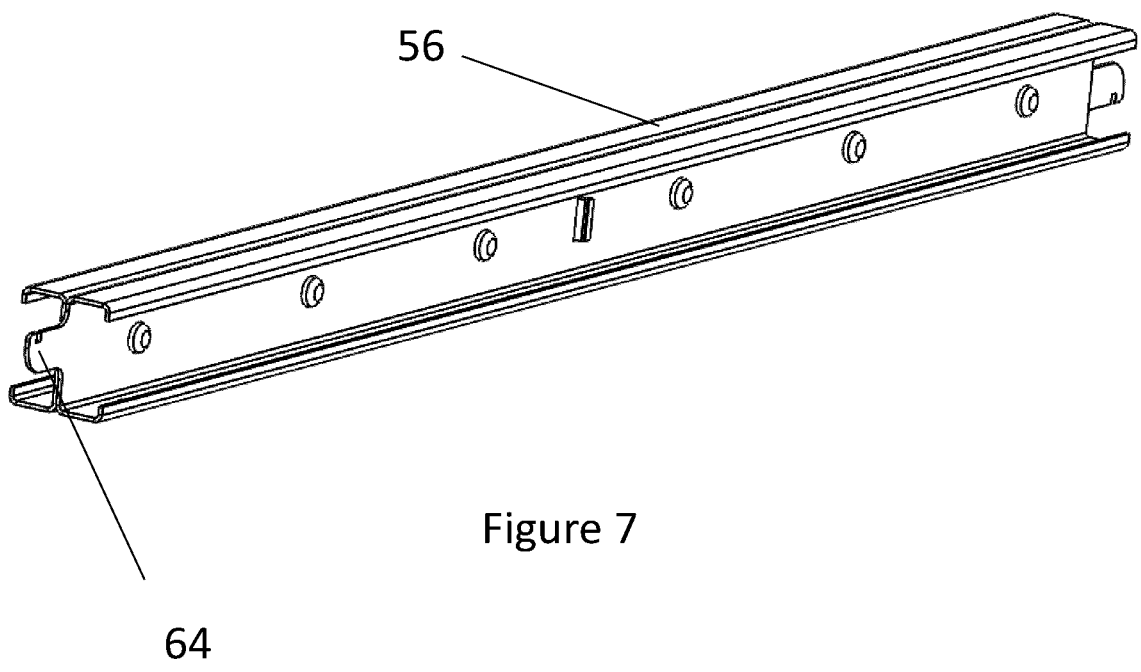
FIG. 7 is a perspective view of a track support.
Figure 9:
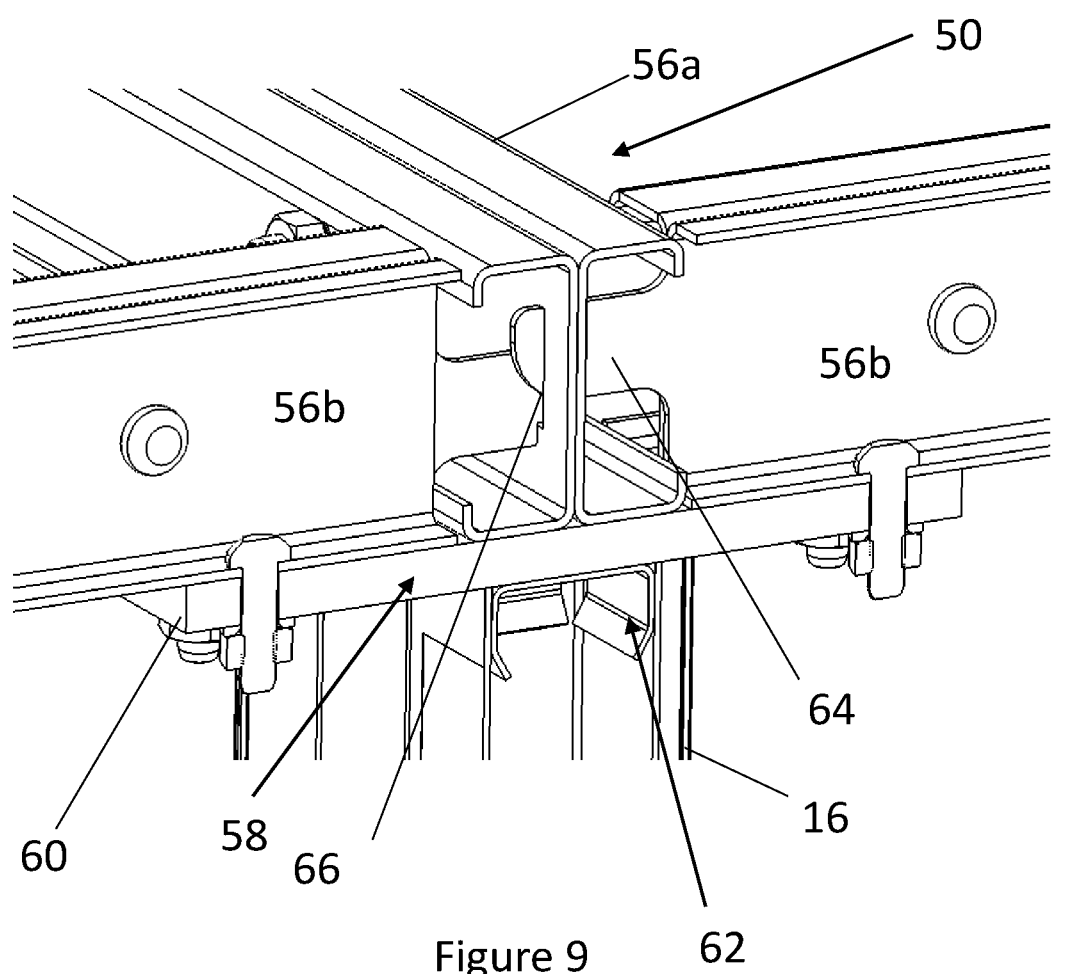
FIG. 9 is a perspective cross sectional view of the interconnection of the vertical uprights to the grid members by the cap plate at a node.

As shown in FIG. 8, the cap plate 58 is cross shaped having four connecting portions 60 for connecting to the ends or anywhere along the length of the track support elements 56 at their intersections 50. The interconnection of the track support elements to the vertical uprights at the nodes by the cap plate 58 is demonstrated in the cross-sectional profile of the node 50 shown in FIG. 9. The cap plate 58 comprises a spigot or protrusion 62 that is sized to sit in the hollow central section 46 of the vertical upright 16 in a tight fit for interconnecting the plurality of upright columns to the track support elements as shown in FIG. 9. Also shown in FIG. 9 are the track support elements 56a, 56b extending in both perpendicular directions corresponding to the first direction (x-direction) and the second direction (y-direction). The connecting portions 60 are perpendicular to each other to connect to the track support elements 56a, 56b extending in the first direction and in the second direction. The cap plate 58 is configured to be bolted to the ends of the track support elements 56a, 56b or along the length of the track support elements. The track support elements 56a, 56b are arranged to interlock with one another at the nodes to form the grid structure 40 according to the present invention. To achieve this, distal or opposing ends of each of the track support elements 56a, 56b comprise locking features 64 for interconnecting to corresponding locking features 66 of adjacent track support elements. In the particular embodiment of the present invention, opposing or distal ends of one or more track support elements comprise at least one hook or tongue 64 that is receivable in openings or slot 66 midway of an adjacent track support element 56 at the junction where the track support elements cross in the grid structure 40. Referring back to FIG. 7 in combination with FIG. 9, the hooks 64 at the end of a track support element 56 are shown received in an opening 66 of an adjacent track support element extending across a vertical upright 16 at the junction where the track support elements 56 cross. Here, the hooks 64 are offered up to an opening 66 either side of a track support element 56b. In the particular embodiment of the present invention, the opening 66 is half way along the length of the track support element 56 so that when assembled together, adjacent parallel track support elements 56 in the first direction and in the second direction are offset by at least one grid cell. This is demonstrated in FIG. 6.

Figure 10:
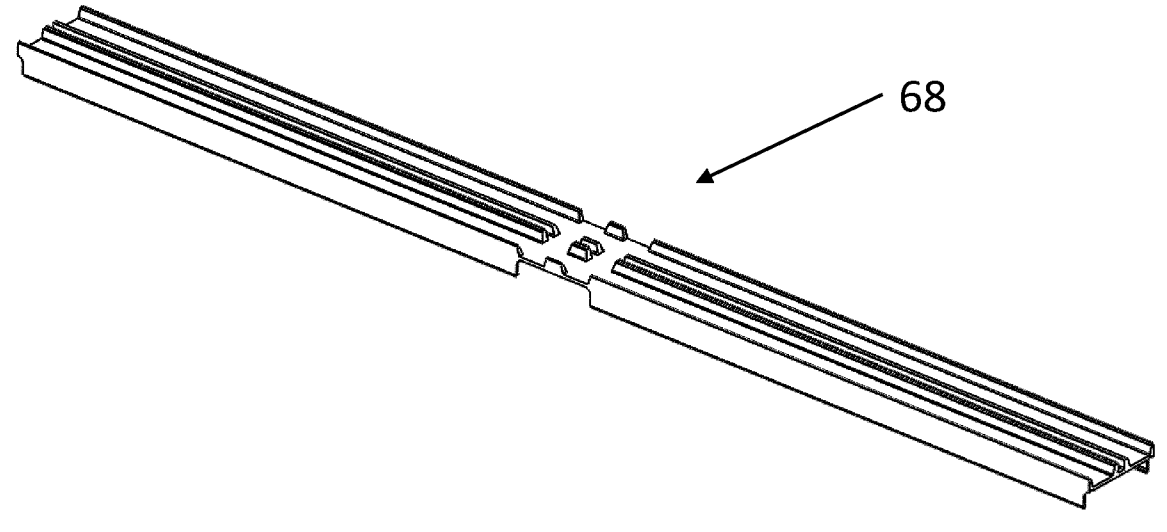
FIG. 10 is a perspective view of a track or rail.

To complete the grid structure 40 once the track support elements 56 are interlocked together to form a grid pattern comprising track supports 18 extending in the first direction and track supports 20 extending in the second direction, a track 22a, 22b is mounted to the track support elements 56. The track 22a, 22b is either snap-fitted and/or fitted over the track support 18, 20 in a slid fit arrangement (see FIG. 6). Like the track support of the present invention, the track comprises a first set of tracks 22a extending in the first direction and a second set of tracks 22b extending in the second direction, the first direction being perpendicular to the second direction. A first set of tracks 22a is sub-divided into multiple track elements 68 in the first direction such that when assembled adjacent parallel track elements in the first direction are offset by at least once grid cell. Similarly, a second set of tracks 22b is sub-divided into multiple track elements 68 in the second direction such that when assembled adjacent track elements in the second direction are offset by at least one grid cell. This is demonstrated in FIG. 6. An example of a single track element 68 is shown in FIG. 10. As with the track support elements, multiple track elements in the first direction and the second direction are laid together to form a track in both directions. The fitting of the track element 68 to the track support 18, 20 comprises an inverted U-shaped cross-sectional profile that is shaped to cradle or overlap the top of the track support 18, 20. One or more lugs extending from each branch of the U shape profile engage with the ends of the track support 18, 20 in a snap fit arrangement. Equally, plausible in the present invention is that the track 22a, 22b can be integrated into the track supports 18, 20 rather than being separate components.

Figure 1:
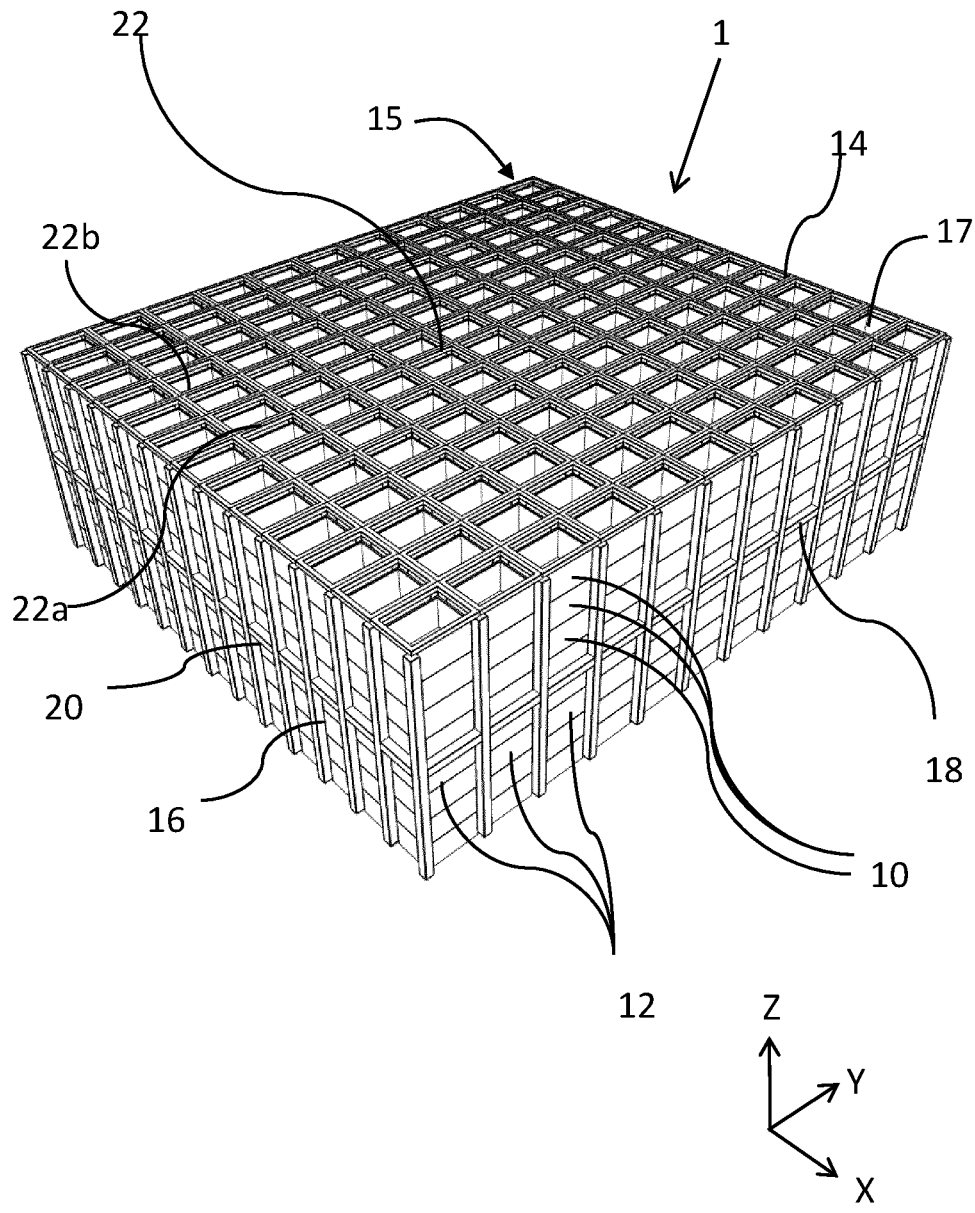
FIG. 1 is a schematic diagram of a grid framework structure according to a known system.
Figure 2:
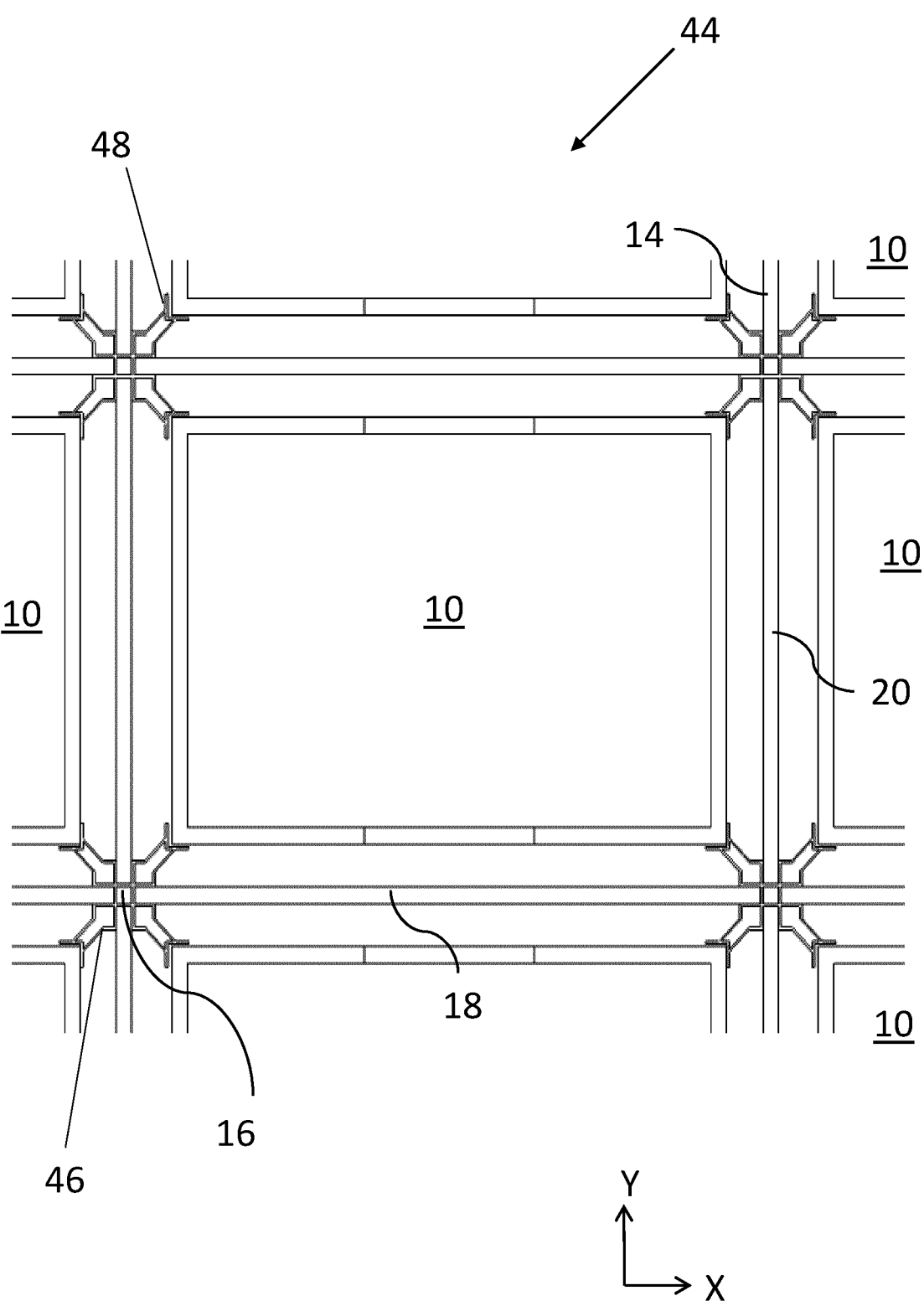
FIG. 2 is a schematic diagram of a top down view showing a stack of bins arranged within the framework structure of FIG. 1.
Figure 3:
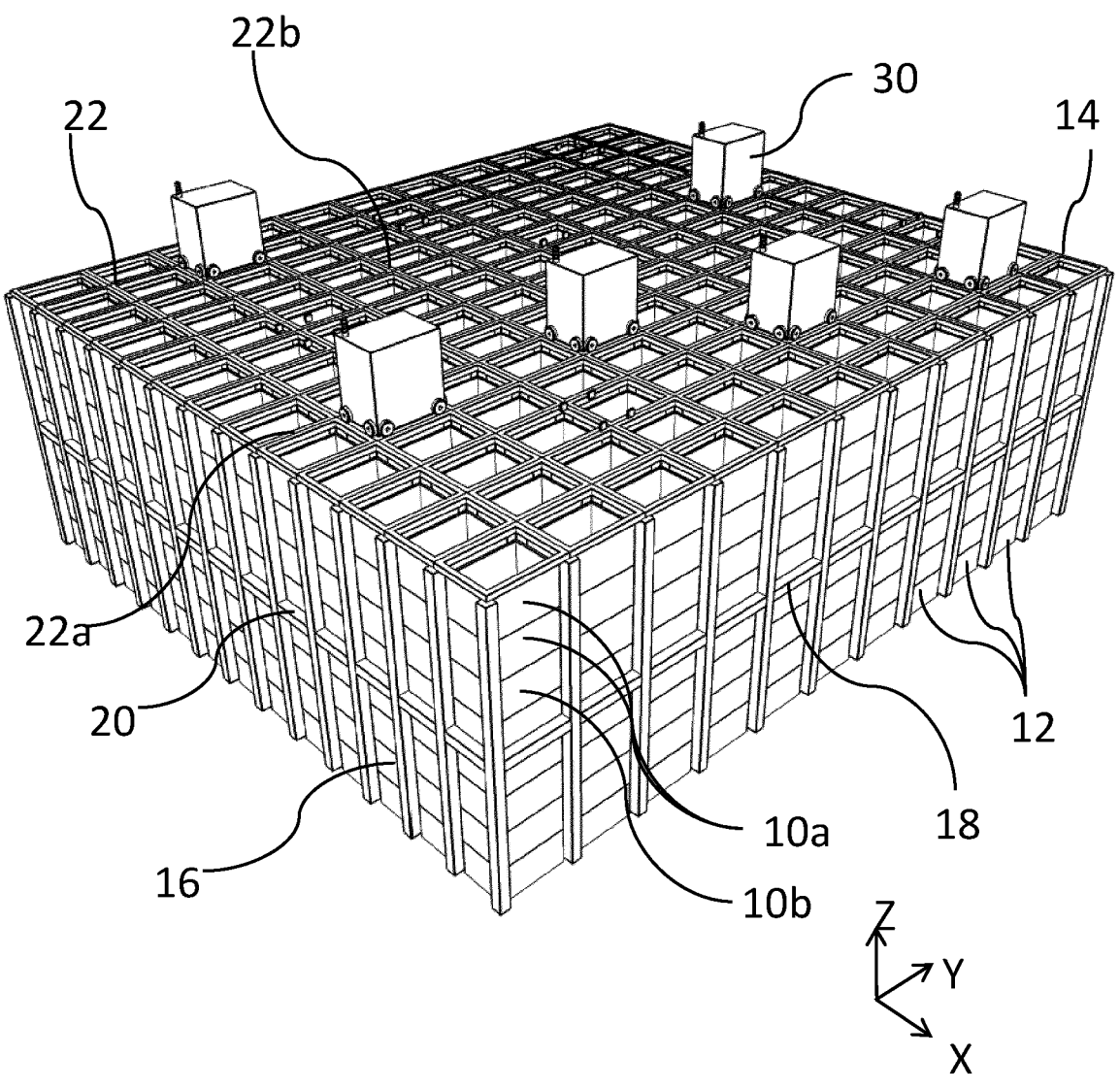
FIG. 3 is a schematic diagram of a known storage system of a load handling device operating on the grid framework structure.
Figure 4:
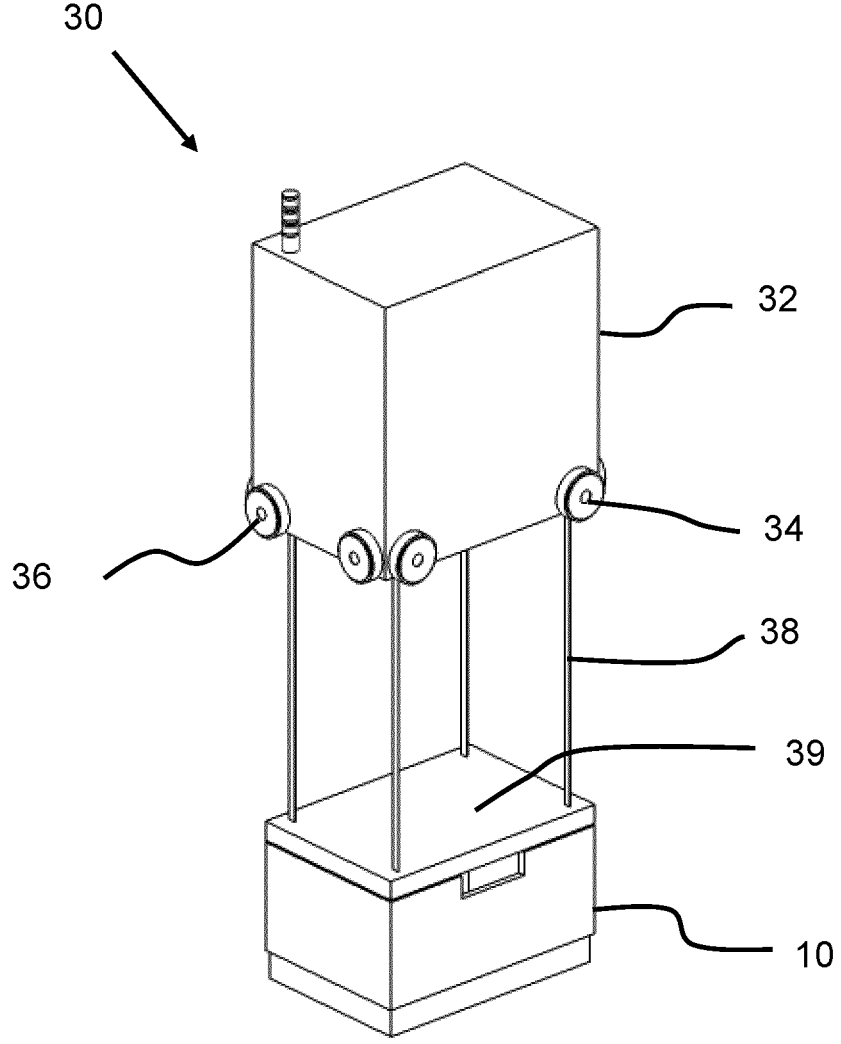
FIG. 4 is a schematic perspective view of the load handling device showing the lifting device gripping a container from above.
Figure 5:
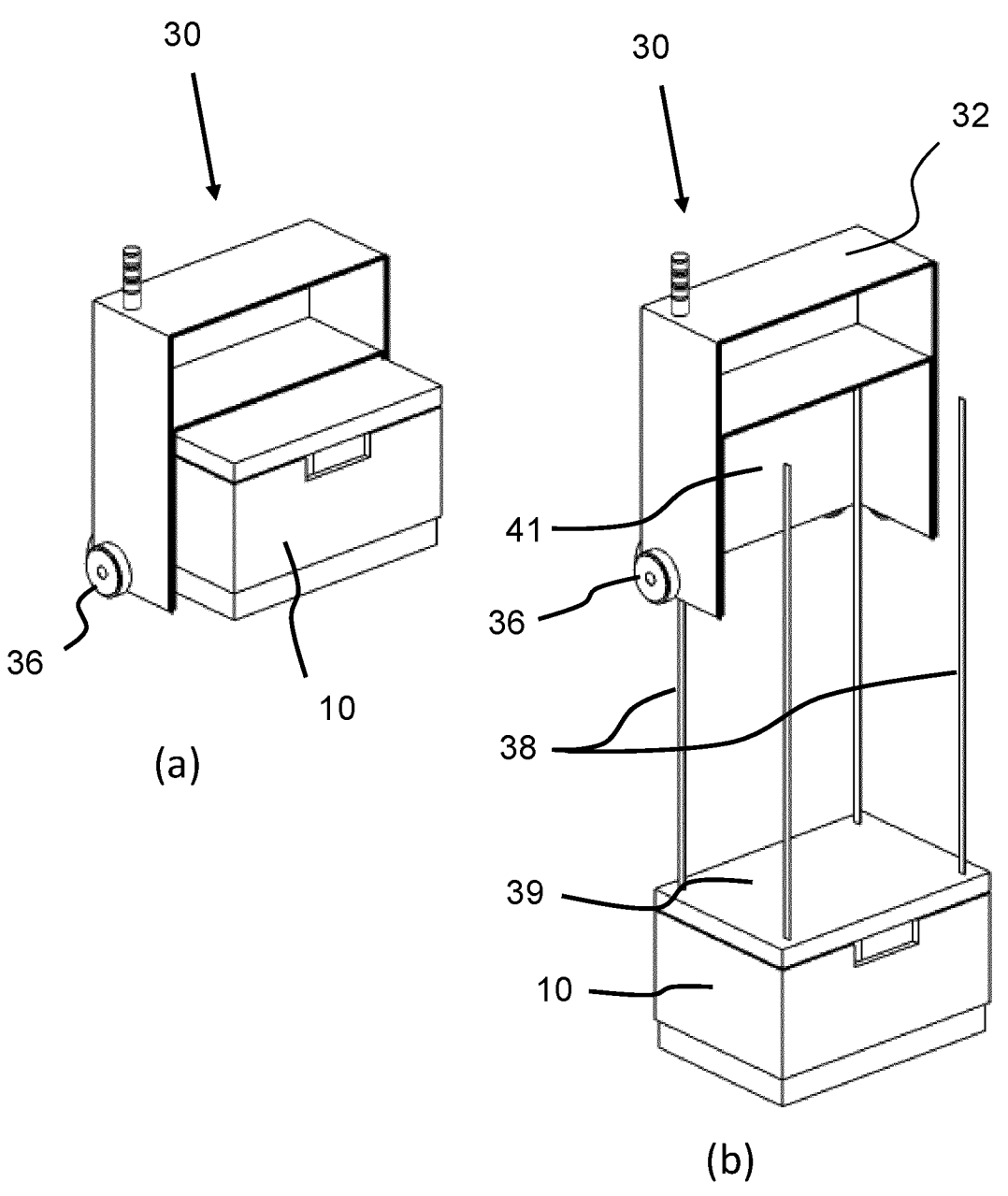
FIGS. 5(*a*) and 5(*b*) are schematic perspective cut away views of the load handling device of FIG. 4 showing (a) a container accommodated within the container receiving space of the load handling device and (b) the container receiving space of the load handling device.
Figure 11:
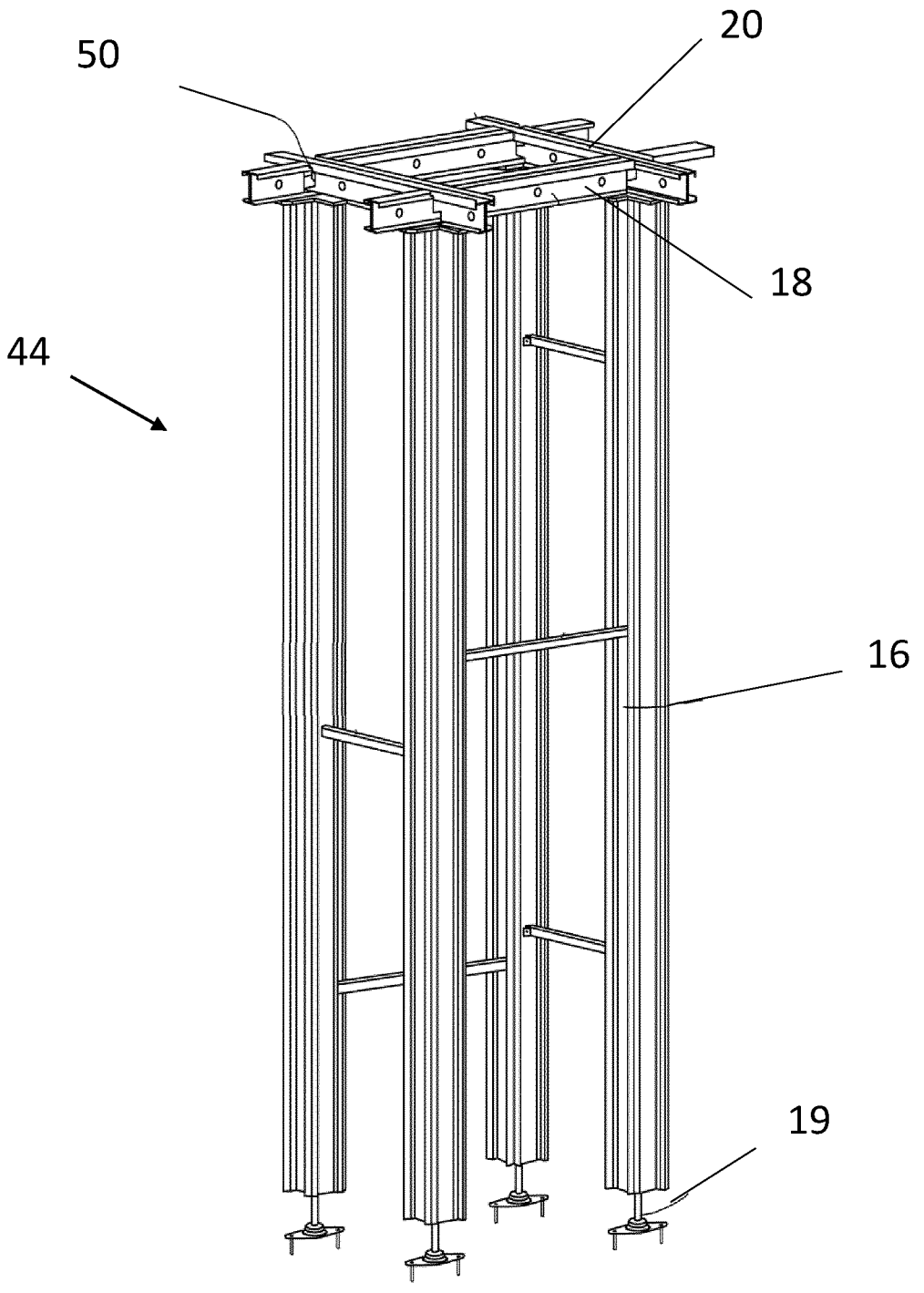
FIG. 11 is a perspective view showing four vertical uprights making up a storage space or storage column within a grid framework structure.

As shown in FIG. 11, the vertical uprights are typically arranged so that a single grid cell 42 is supported by four vertical uprights 16 to form a single storage column 44 for the storage of one or more containers 10 in a stack. The transverse cross-section in the horizontal plane of the storage location 44 in FIG. 2 shows that an individual storage column 44 is made up of four vertical uprights 16 arranged at the corners of the container or storage bin 10. A storage column 44 corresponds to a single grid cell. The cross section of the vertical upright 16 is constant over the whole length of the vertical upright. The periphery of a container or storage bin in the horizontal plane in FIG. 2 shows the container or storage bin having four corners and the arrangement of four vertical uprights 16 at the corners of the containers or storage bins within the storage column 44. A corner section of each of the four vertical uprights, one from each of the four vertical uprights, ensure that a container or storage bin stored in the storage column 44 is guided into a correct position relative to any container or storage bin stored within the storage column and the stacks of containers or storage bins in the surrounding storage columns. A load handling device operative (not shown) on the grid structure 40 is able to lift a container or storage bin as it is guided along the vertical uprights 16 through a grid cell 42.

The term "vertical upright(s)", "upright member(s)" and "upright column(s)" are used interchangeably in the description to mean the same thing. Each of the vertical uprights 16 is generally tubular. In detail as shown in FIG. 2, each of the vertical uprights 16 comprises a hollow centre section 46 (typically a box section) with one or more guides 48 mounted to or formed at the corners of the hollow centre section 46 that extends along the longitudinal length of the vertical upright 16 for guiding the movement of the containers along the storage column 44. The one or more guides 48 comprise two perpendicular container guiding plates. The two perpendicular container guiding plates are arranged to accommodate a corner of a container or a corner of a stack of containers. In other words, each of the corners of the hollow centre section 46 defines two sides of a substantially triangular area which may accommodate a corner of a container or storage bin. The corners are evenly arranged around the hollow centre section 46, such that multiple vertical uprights 16 may provide multiple adjacent storage columns, wherein each vertical upright 16 may be common or shared for up to four separate storage columns.

Also shown in FIG. 11 is that each of the vertical uprights 16 is mounted to an adjustable grid levelling mechanism 70 at the foot of the vertical uprights comprising a base and a threaded shaft that can be extended or retracted to compensate for an uneven floor. Further detail of the adjustable grid levelling mechanism is discussed below. It should be noted that the present invention is not limited to the grid structure being supported at each of the intersections or nodes of the grid structure. The grid structure can be supported at any section or portion of the grid structure. For example, the grid structure can be supported just at the corners of the grid structure. In this case, the connection or cap plate 58 comprises at least two perpendicular connecting portions 60 for connecting to the ends or anywhere along the length of the track support elements at their intersections 50, e.g. at the corner of the grid structure.

Figure 12:
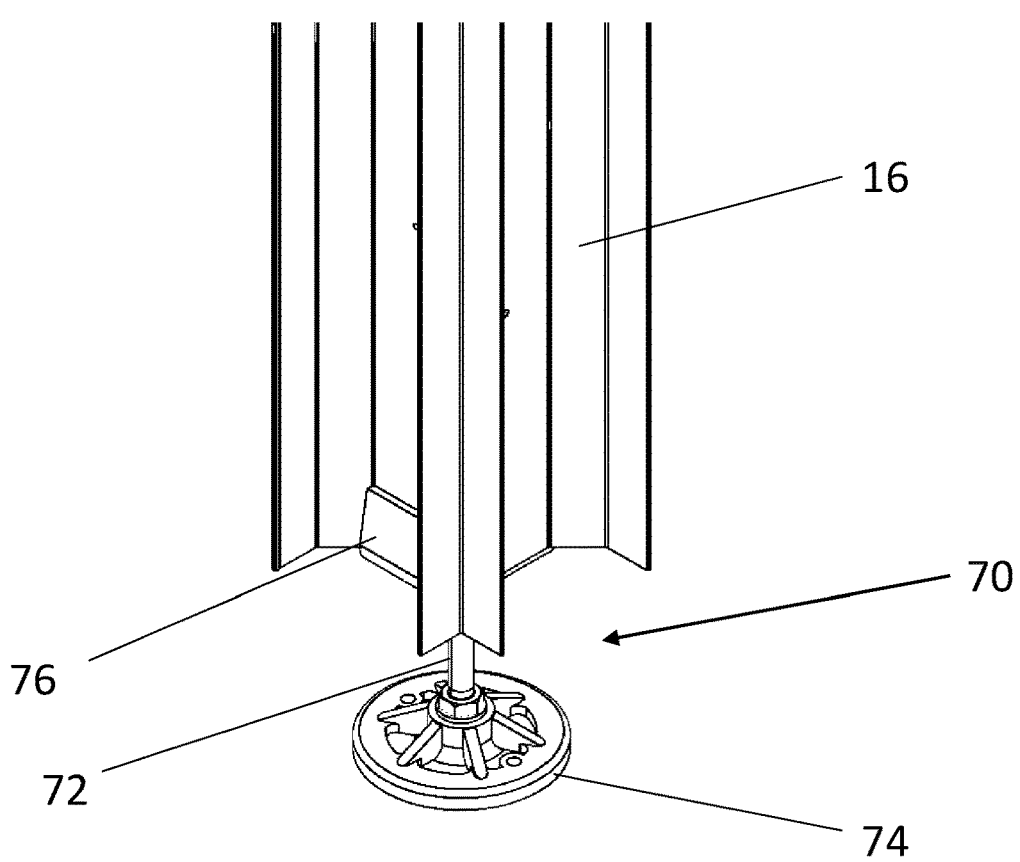
FIG. 12 is a perspective view of a known adjustable grid levelling mechanism at the foot of a vertical upright.
Figure 13:
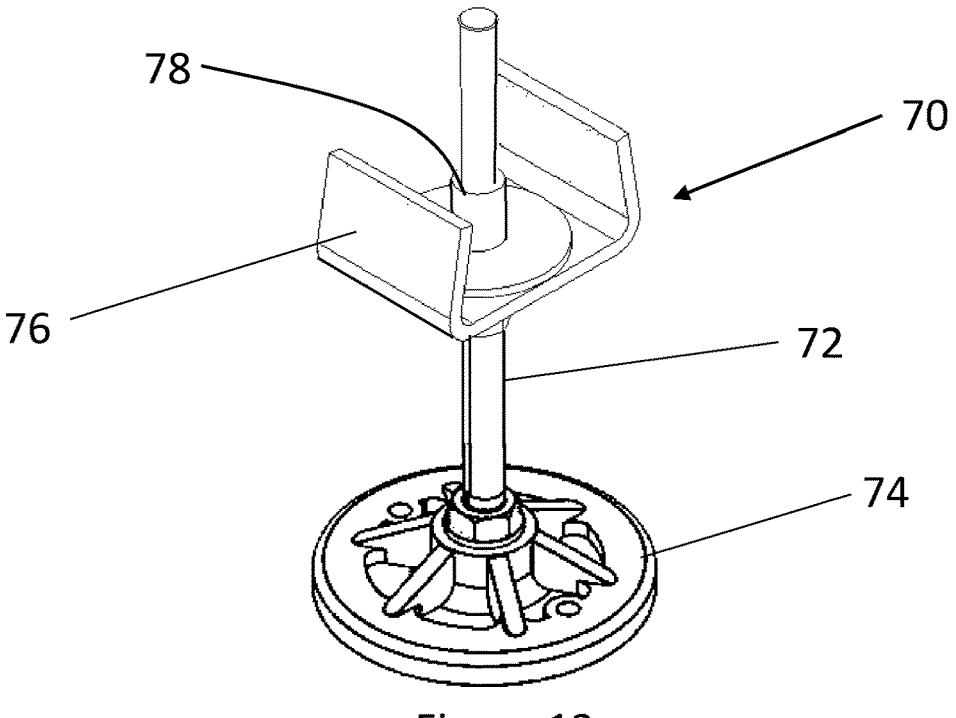
FIG. 13 is a perspective view of the known adjustable grid levelling mechanism shown in FIG. 12.

As shown in FIG. 11 and in detail in FIGS. 12 and 13, the vertical uprights are anchored to the floor, more specifically a concrete foundation, by an adjustable foot 70 comprising a threaded shaft 72 that can be extended or retracted to compensate for an uneven floor. By virtue of its name, the adjustable foot or adjustable anchor foot 70 is mounted to the lower end of the vertical uptight 16. The adjustable foot 70 as shown in FIG. 13 comprises a base plate 74 and a threaded spindle or rod 72 that is threadingly engageable with a separate push fit cap or plug 76. The push fit cap 76 is arranged to be fitted to the lower end of the vertical upright 16 in a tight fit so as to adjust the height of the vertical upright 16. The push fit cap 76 as shown in FIGS. 12 and 13 comprises bent portions that are arranged to seat the lower end of the vertical upright 16, more specifically around the box section. In use, the threaded spindle 72 threadingly engages with the threaded hole 78 of the push fit cap 76. Rotation of the threaded spindle 72 varies the distance between the base plate 74 resting on the floor and the push fit cap 76, and thereby varies the height of the vertical upright 16 in the grid framework structure. Traditionally, the grid level is measured at the upper end of the vertical upright each time adjustments are made to the adjustable foot 70 at the lower end of the vertical upright. As a result, correcting the level of the grid structure necessitates two operators; one at the top of the grid framework structure to measure the level of the grid structure 40, and one at the bottom of the grid framework structure to make the necessary adjustments to the height of the vertical uprights.

Figure 14:
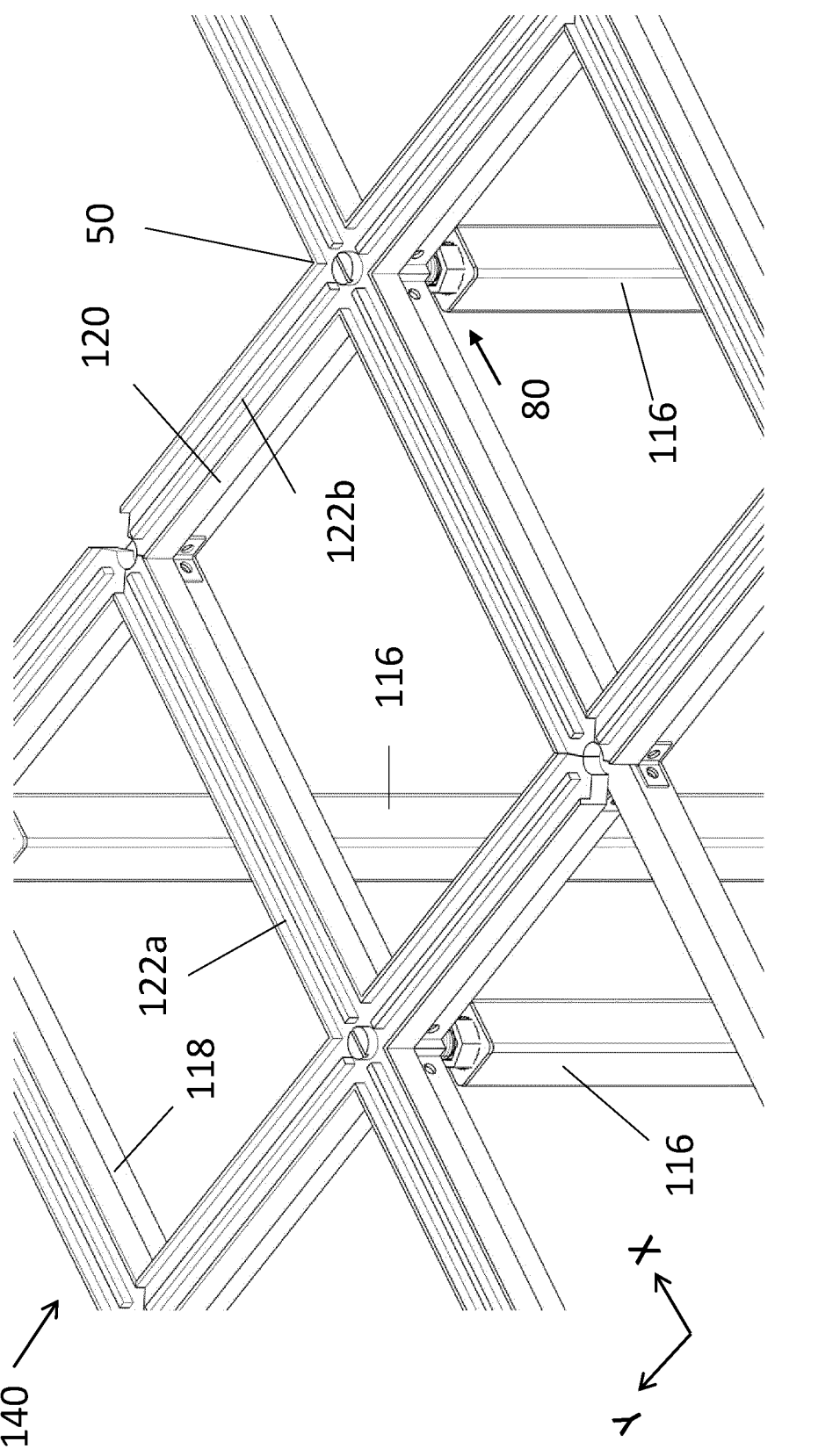
FIG. 14 is a perspective view of a section of the grid framework structure showing the mounting of the grid structure to the vertical uprights by the adjustable grid levelling mechanism.

In a preferred embodiment of the present invention, an adjustable grid levelling mechanism is interposed between the top of the vertical upright and the grid structure. This allows the adjustment of the grid level to be made at the point where the measurement of the grid level is being carried out. Thus, adjustments of the grid level can be made in-situ or in real time as the grid level is measured. An example of transferring the adjustable grid levelling mechanism to the connection at the upper end of the vertical upright with the grid structure 140 is shown in FIG. 14. In the particular embodiment of the present invention shown in FIG. 14, the grid members comprise track supports 118, 120 that are connected together at a node or an intersection 50 of the grid structure 140 by an adjustable grid levelling mechanism 80. Also shown in FIG. 14 are tracks 122a, 122b mounted to the track supports 118, 120.

Figure 15:
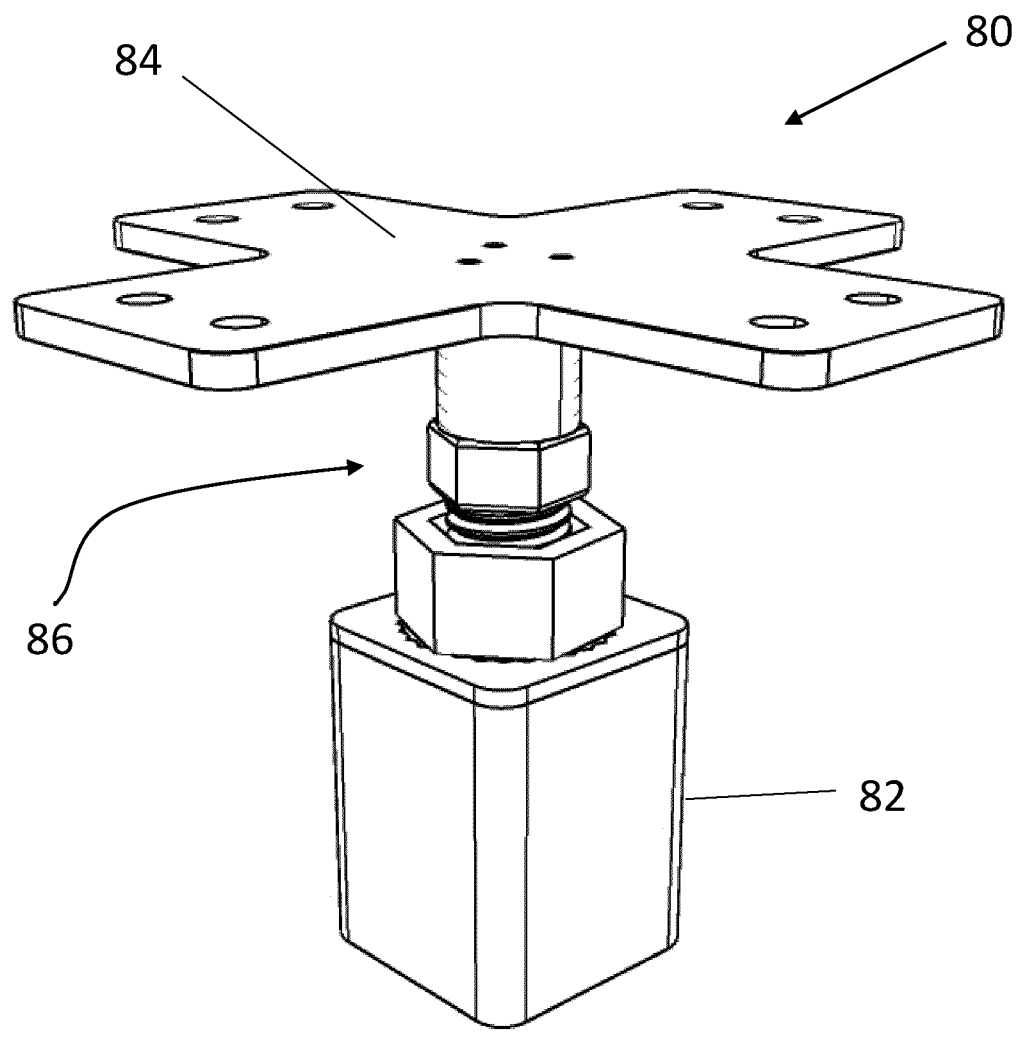
FIG. 15 is a perspective view of an adjustable grid levelling mechanism according to a first embodiment of the present invention.

An individual adjustable grid levelling mechanism 80 shown in FIG. 15 comprises a base 82 for mounting to the top end of the vertical upright, a mounting head 84 for mounting to the grid structure and an extendible section 86 interposed between the base 82 and the mounting head 84 such that the mounting head 84 is moveable relative to the base 82. The base 82 is configured to be mounted to an upper end of a vertical upright 16. In the particular embodiment of the present invention shown in FIG. 16, the base 82 comprises an insert that is configured to be received in an open end of the box section at the upper end of the vertical upright 16. The insert 82 is secured to the upper end of the vertical upright by one or more bolts 88. Interposed between the base 82 and the mounting head 84 is an extendible section 86. In an example of the present invention shown in FIG. 16, the extendible section 86 comprises a threaded shaft or spindle 90 that is arranged to threadingly engage with the insert 82, more specifically a threaded hole in the insert 82. Mounted to the threaded shaft or spindle 90 is a mounted head 84. Thus, rotation of the threaded shaft or spindle 90 causes the threaded shaft 90 to extend or retract within the insert 82, and thus alters the height of the mounting head 84 relative to the insert 82. To assist with the rotation of the threaded shaft 90, the threaded shaft 90 comprises a nut 92 to allow a tool such as a spanner to engage with the nut 92 such that rotation of the nut rotates the threaded shaft 90. In the particular example shown in FIG. 16, the nut 92 has a hexagonal shape to allow a spanner to engage with the nut 92.

Figure 16:
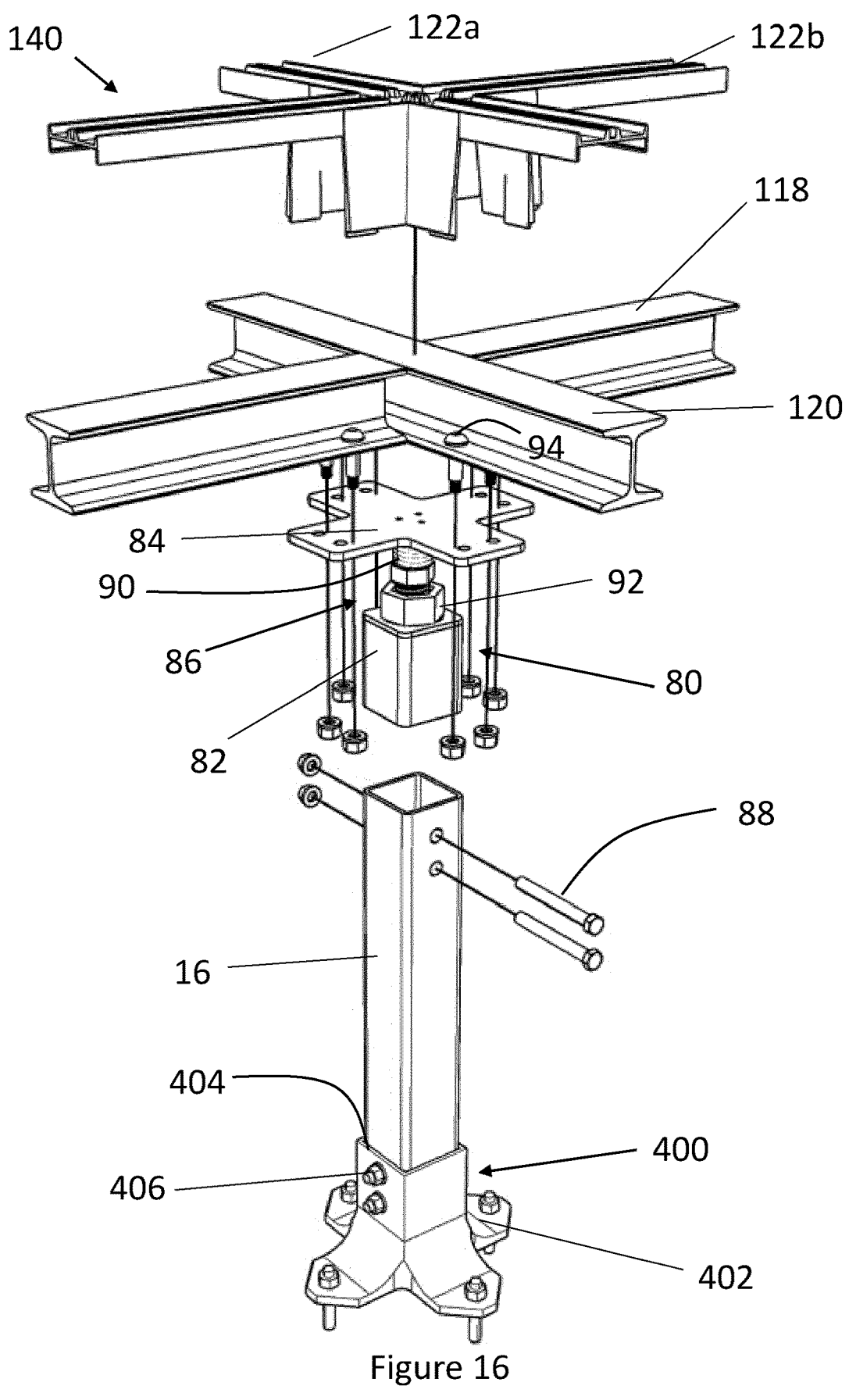

Mounted to the threaded shaft 90 is the mounting head 84 for mounting the grid structure 140 or at least a portion of the grid structure to the adjustable grid levelling mechanism 80. In a first embodiment of the present invention shown in FIG. 15 and FIG. 16, the mounting head 84 comprises the cap plate discussed above with reference to FIG. 8 that has been adapted to be mounted to the threaded shaft 90. Thus, instead of a spigot 62 to enable the cap plate to be mounted to the upper end of the vertical upright, the lower end of the cap plate is adapted to receive the threaded shaft 90 as shown in FIG. 15. The connections of the cap plate 84 to the grid structure at the node or the intersection of the grid members can be the same discussed above with reference to FIG. 8. In the particular embodiment of the present invention as shown in FIG. 16, the cap plate 84 comprises four connecting portion for connecting to the grid members 118, 120 at the nodes of the grid structure 140 by one or more bolts 94. The grid members 118, 120 shown in FIG. 16 comprise track supports 118, 120 to which are mounted tracks or rails 122a, 122b. The track supports 118, 120 are in the form of I-beams to provide the necessary structural support to the grid structure 140. The track supports 118, 120 are mounted to the cap plate 84 by the one or more bolts 94. Mounted to the track supports 118, 120 are tracks 122a, 122b for guiding one or more load handling devices on the grid structure 140 that extend in the first direction and in the second direction.

Rotation of the threaded shaft 90 about the longitudinal axis of the vertical upright 16, causes the thread shaft 90 to extend or retract relative to the base 82. As the mounting head 84 is mounted to the upper end of the threaded shaft 90, extension or retraction of the threaded shaft 90 results in the mounting head 84, and thus the grid structure 140 mounted thereon, to be adjusted vertically.

In use, an operator measuring the level of the grid structure 140 at grid height can make routine adjustments to the grid level at grid height to ensure that the grid structure substantially lies in a horizontal plane. Whilst the particular embodiment shows the mounting head 84 to comprise a cap plate, other mounting heads for mounting the grid structure thereon are applicable in the present invention. As an alternative to the cap plate 84 discussed above with reference to FIG. 8, the adjustable grid levelling mechanism 180 according to a second embodiment of the present invention shown in FIG. 17 comprises a mounting head 184 comprising nodules or shaped bosses 160 mounted to a central post or shaft 190. In this embodiment, the track supports are tubular, more specifically box sections. The nodules or shaped bosses 160 are shaped to be receivable in the box section at an open end of the track support 118, 120 at an intersection or node of the grid structure. Four nodules or bosses 160 are shown extending in perpendicular directions from the central post or shaft 190 and arranged to be receivable in four track supports at a node or intersection 50. As with the adjustable grid levelling mechanism discussed above with reference to FIG. 15, the central post 190 threadingly engages with an insert 182 that is receivable in the hollow centre section of a vertical upright 16. The central post 190 can be extended or retracted relative to the insert

Figure 17:
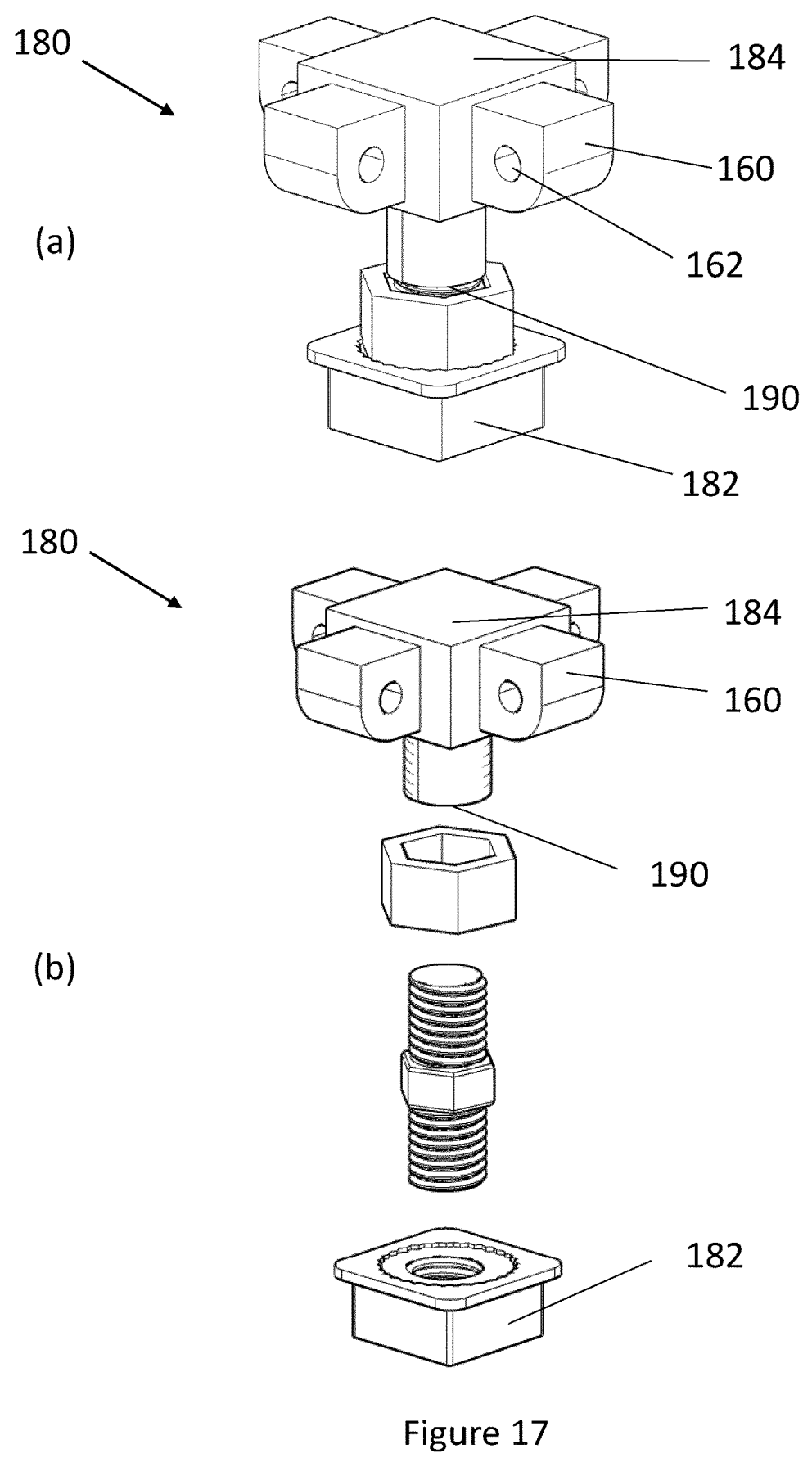
Figure 18:
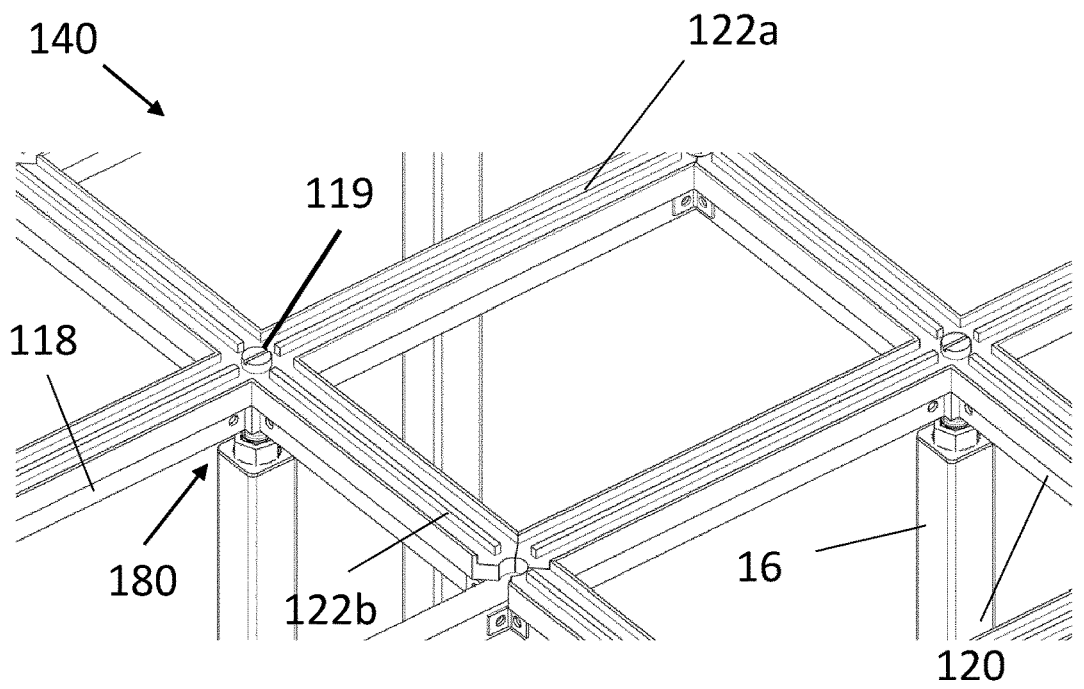
FIG. 18 is a perspective view of a section of the grid framework structure showing the tracks fastened to the track supports according to the embodiment of the invention shown in FIG. 17.
Figure 19:
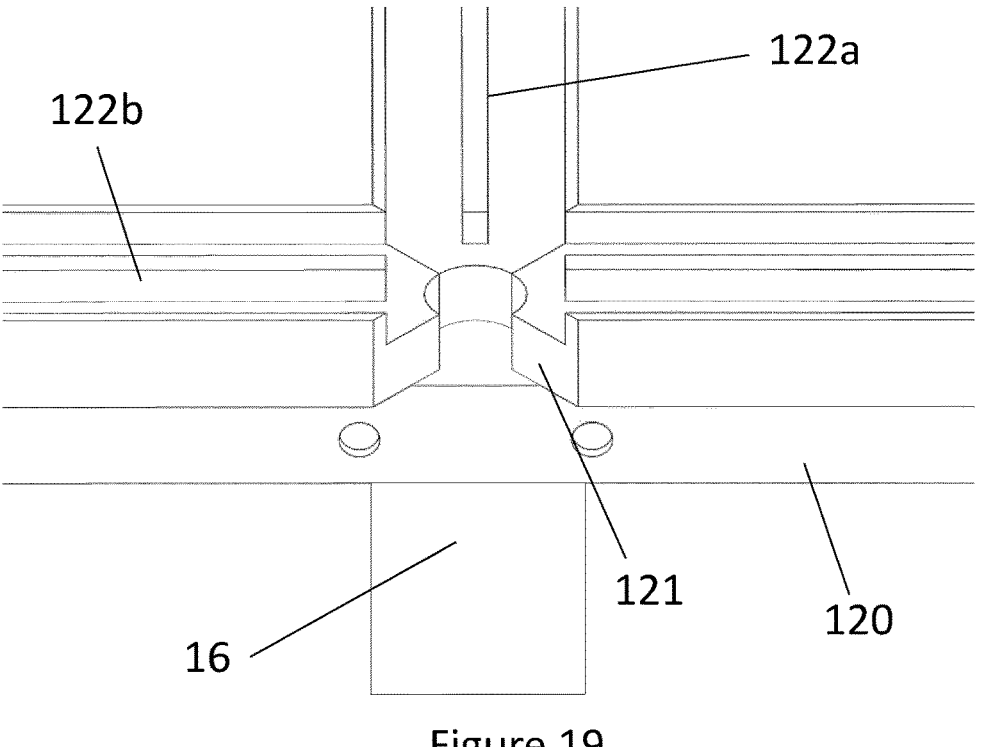
FIG. 19 is an enlarged view of the connections of the tracks at the nodes according to the embodiment shown in FIG. 18.

182 to adjust the height of the mounting head 184, and thus the level of the grid structure at a node or intersection. FIG. 17(*a*) shows the mounting head 184 of the adjustable grid levelling mechanism 180 in a retracted configuration, and FIG. 17(*b*) shows the mounting head 180 of the adjustable grid levelling mechanism 180 in an extended configuration relative to the insert 182. The threaded post or shaft 190 can be extended or retracted relative to the insert 182 to adjust the height, and thus the level of the track support mounted thereon. To further secure the track support to the adjustable grid levelling mechanism 180 once the nodule or boss 160 of the mounting head 184 is received into a box section of the track support, each of the nodules 160 comprises a hole 162 for receiving a bolt that is threaded through a hole in the track support 118, 120 proximal to its end. The adjustable grid levelling mechanism 180 according to the second embodiment of the present invention is used to join the track supports 118, 120 to a vertical upright 16 at the intersections or nodes 50 of the grid structure 140. Tracks 122a, 122b are mounted to the tracks supports 118, 120 to guide one or more load handling devices on the grid structure. One or more fasteners 119 can be used to secure the tracks 122a, 122b to the track supports 118, 120. The tracks 122a, 122b are secured to the track supports 118, 120 at the nodes where the track supports 118, 120 intersect in the grid structure 140. In the particular embodiment shown in FIG. 18, the tracks 122a, 122b are secured to the track supports 118, 120 by a threaded bolt threadingly engaging with the mounting head 184 of the adjustable grid levelling mechanism. Also shown in FIG. 18 and clearly shown in FIG. 19 is that the ends 121 of the tracks are V shaped with a substantially 45° angle that meets where the tracks intersect at a node of the grid structure to provide a stable joint. The V shape of the ends of the tracks improves the stability of the tracks at the intersections where the tracks meet at the node.

In both the first and second embodiments of the present invention described with reference to FIGS. 14 to 17, the extendible section of the adjustable grid levelling mechanism comprises a threaded shaft that threadingly engages with an insert. The thread of the shaft bears the full weight of the grid mounted thereon and one or more load handling devices operative on the grid structure. The threads may run the risk of being cross threaded or become worn removing its ability to extend or retract.

Figure 20:
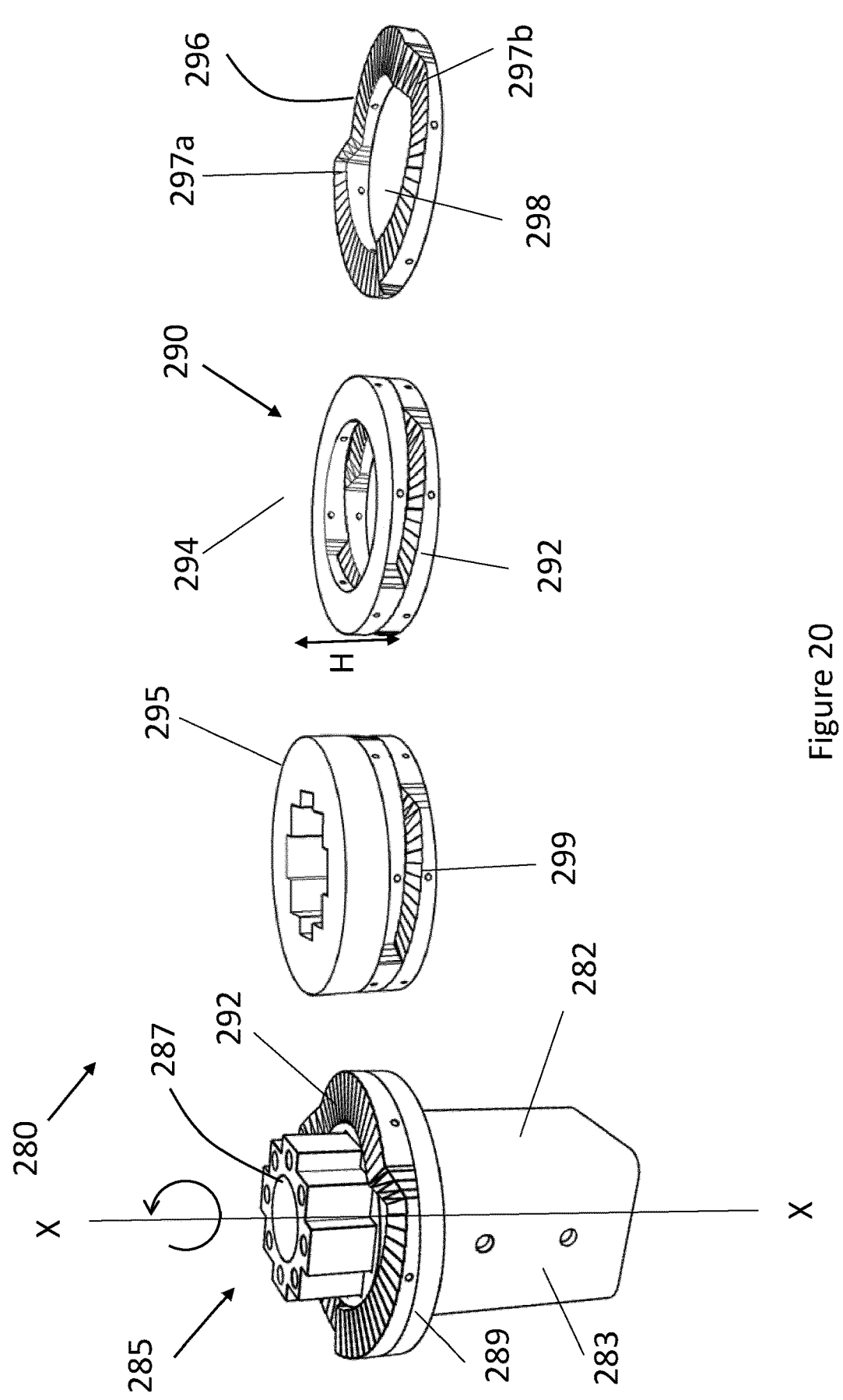
FIG. 20 is a perspective view of an adjustable grid levelling mechanism according to a third embodiment of the present invention showing the assembly of mating washer and the seating of the mating washer on the base.

In a third embodiment of the present invention shown in FIG. 20, the adjustable grid levelling mechanism 280, more specifically the extendible section or portion 290 for adjusting the level of the grid structure, can comprise a pair of mating washers 292, 294 (a first mating washer 292 and a second mating washer 294) wherein the mating faces or opposing faces 296 of each of the pair of mating washers 292, 294 has a profile or contour with a variable height extending in or around the circumferential direction such that rotation of one of the pair of mating washers 292, 294 relative to the other causes the height of the pair of the mating washers 292, 294 to be adjusted. In comparison to a threaded shaft which bears the weight of the grid structure, the advantage of the pair of mating washers 292, 294 is that the load is distributed across the mating faces 296 of the mating washers 292, 294, removing the possibility of cross threading that exists with a threaded shaft.

As shown in FIG. 20, each of the pair of mating washers 292, 294 has an annular shape. The mating washers 292, 294 are seated or assembled on top of each other such that their mating faces or the opposing faces 296 of the mating washers 292, 294 cooperate. In the particular embodiment of the present invention shown in FIG. 20, the mating faces or opposing faces 296 of both of the mating washers 292, 294 (first and second mating washers) in the pair have a profile or contour with a variable height extending around the circumferential direction of each of the mating washers such that rotation of one of the pair of mating washers (i.e. the first or second mating washer) relative to the other causes the height of the pair of the mating washers 292, 294 to be adjusted. More specifically, the rotational axis X-X is common to both mating washers 292, 294 in the pair. The pair of mating washers are co-axial, such that during rotation of one of the pair of mating washers about the longitudinal axis X-X of the vertical upright 16, the mating face 296 of one of the pair of mating washers (first mating washer) rides over the mating face 296 of the other of the pair of mating washers (second mating washer).

The variable height profile or contour extending around the circumferential direction of the mating faces causes the height H of the mating washers 292, 294 to be varied as one of the mating washers is rotated relative to the other washer (see FIG. 20). In one example, the contour or profile of the mating faces undulates so as to comprise a high profile 297*a* and a low profile 297*b*. The undulations of each of the mating faces 292, 294 comprises at least one high portion 297*a* and at least one low portion 297*b*. The at least one high portions 297*a* of each of the mating faces 296 cooperate as one of the mating washers 292, 294 rotates relative to the other to increase the height of the mating washers. Equally, the low portions 297*b* cooperate to lower the height of the mating washers 292, 294. The adjustment of the height of the mating washers can be varied as their mating faces rotate between the high and low portions. In another example, the contour or profile of the mating face comprises one or more wedge faces. The angle that the wedge shaped face 296 makes with an underside of at least one of the mating washers 292, 294 controls the height H adjustment of the pair of mating washers 292, 294. More specifically, the angle of inclination that the wedge shaped face 296 makes with the horizontal plane in which the at least one of the mating washers lies controls the height H adjustment of the pair of mating washers 292, 294. A more steeply inclined angle provides a more coarse adjustment of the height and a gentler angle of the wedge shaped face 296 provides a finer adjustment of the height H.

The mating or opposing mating faces 296 can also comprise indexing means or an indexing mechanism 298 such that rotation of at least one mating washer 292, 294 relative to the other mating washer is indexed to lock one of the pair of mating washers relative to the other at a desired rotational angle, and thus height of the washers, i.e. in this case the mating washers can defined as mating locking washers 292, 294. In the particular embodiment of the present invention shown in FIG. 20, the opposing mating faces 296 of each of the pair of mating locking washers 292, 294 comprise teeth 298 that ride over each other to index the rotation of one of the pair of mating locking washers 292, 294 relative to the other mating locking washer. The teeth 298 can be several wedge shaped faces extending in the circumferential direction.

The teeth allow at least one of the pair of mating washers to rotate in one direction (e.g. anti-clockwise) but prevent rotation in the other direction (e.g. clockwise). This allows the at least one of the pair of mating locking washers to lock at a desired rotational angle, and thus height of the pair of mating washers. To release the lock and allow the mating locking washers 292, 294 to rotate in the other direction, e.g. reverse direction, the pair of mating washers 292, 294 can be prised apart to release the engagement features.

Figure 21:
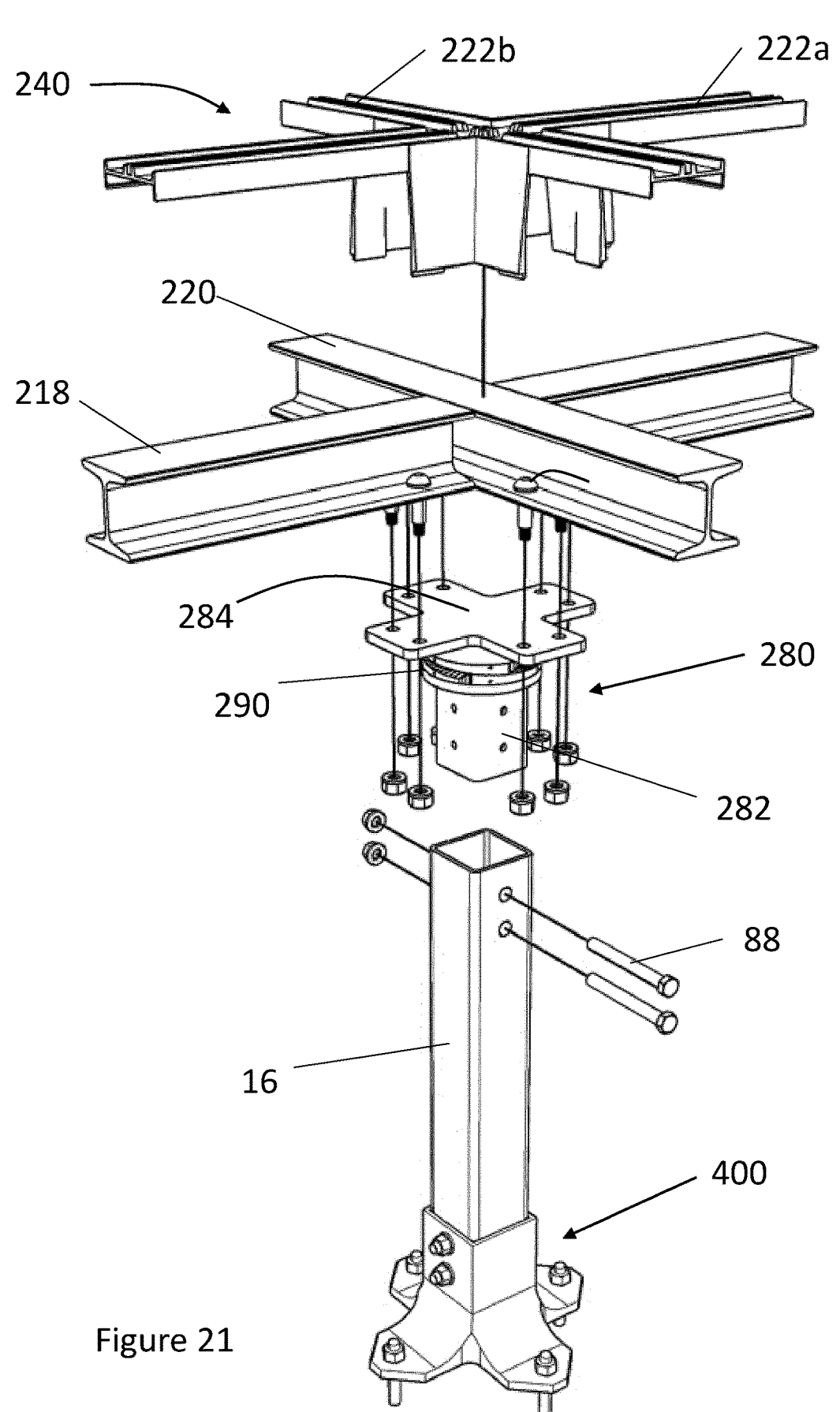
FIG. 21 is an expanded view of the adjustable grid levelling mechanism of FIG. 20 interposed between a portion of the grid structure and the vertical upright according to the third embodiment of the present invention.
Figure 22:
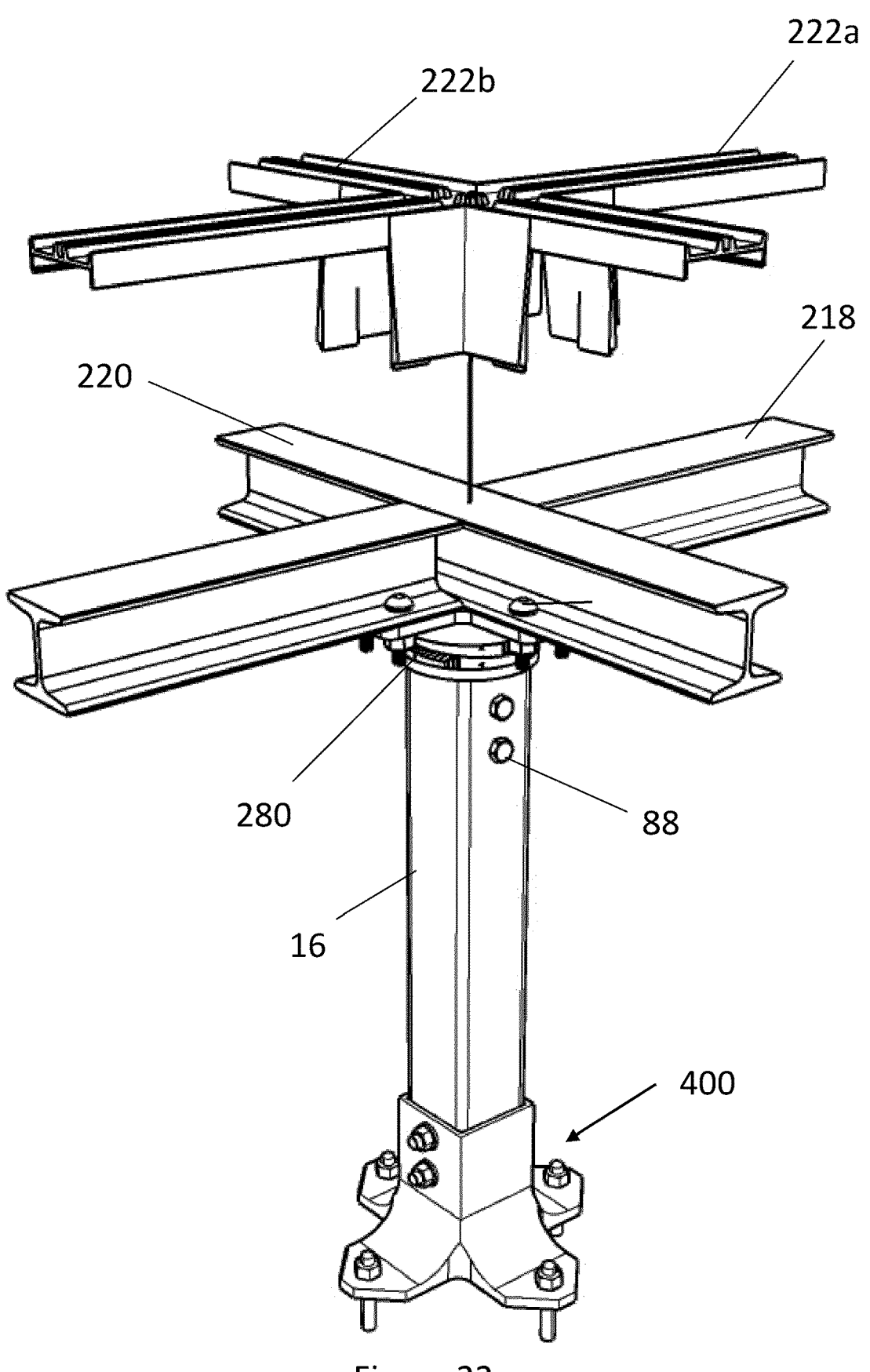
FIG. 22 is a perspective view of the adjustable grid levelling mechanism interposed between a portion of the grid structure and the vertical upright according to the third embodiment of the present invention.

The pair of mating washers 292, 294 has an annular configuration that enables them to be seated on an insert 282 having a lower portion 283 that is receivable in the box section or hollow centre section of the vertical upright as shown in FIG. 21 and FIG. 22. The upper portion 285 of the insert 282 comprises a shaped post 287 for seating the pair of mating washers 292, 294 and the lower portion 283 of the insert 282 is shaped to be receivable in the box section of the vertical upright. The seat comprises a collar or circumferential flange 289 for seating the pair of mating washers 292, 294. A mounting head 284 for mounting the grid structure 240 thereon can then be mounted to the pair of mating washers 292, 294. In the particular embodiment shown in FIG. 21, the mounting head 284 is a cap plate that functions in the same manner as the cap plate to interconnect the grid members 118, 120 to the vertical uprights discussed above with reference to FIG. 8. In the particular embodiment shown in FIG. 21, the grid members comprises track supports 218, 220 and tracks 222*a,* 222*b* mounted thereon or integrated into the track supports. The cap plate 284 is mounted to the upper portion 285 of the insert 282 so as to rest on one side or face of the pair of mating washers 292, 294 such that rotation of at least one of the mating washers relative to the other mating washer causes the height of the pair of mating washers, and thus the height of the cap plate 284, to be adjusted relative to the insert 282. The spigot 62 of the cap plate 284 is receivable in an aperture in the upper portion 285 of the insert 282. The grid members comprising track supports 218, 220 are fixed to the cap plate 284 at the nodes by one or more bolts 94 as shown in FIG. 21.

Equally, the lower portion 283 of the insert 282 receivable in the box section of the vertical upright 16 is fixed to the upper end of the vertical upright 16 by one or more bolts 88. The assembly of the adjustable grid levelling mechanism 280 comprising the pair of mating washers 292, 294 interposed between the upper end of the vertical upright 16 and the grid structure is shown in FIG. 22.

Optionally, as shown in FIG. 20, an additional washer 295 is seated on top of the exterior surface of the pair of mating washers 292, 294 such that the adjustable grid levelling mechanism 280 is sandwiched between the additional washer 295 and the flange 289 of the insert 282. Rotation of the at least one mating washer causes the additional washer 295 to lift the cap plate 284. No special tooling is required to cause at least one of the mating washers to rotate relative to the other. In the particular embodiment shown in FIG. 20, the side or edge of the locking washer comprises an aperture 299 for receiving a pin or rod to drive the rotation of the at least one mating washer relative to the other such that their mating faces ride over each other.

Figure 23:
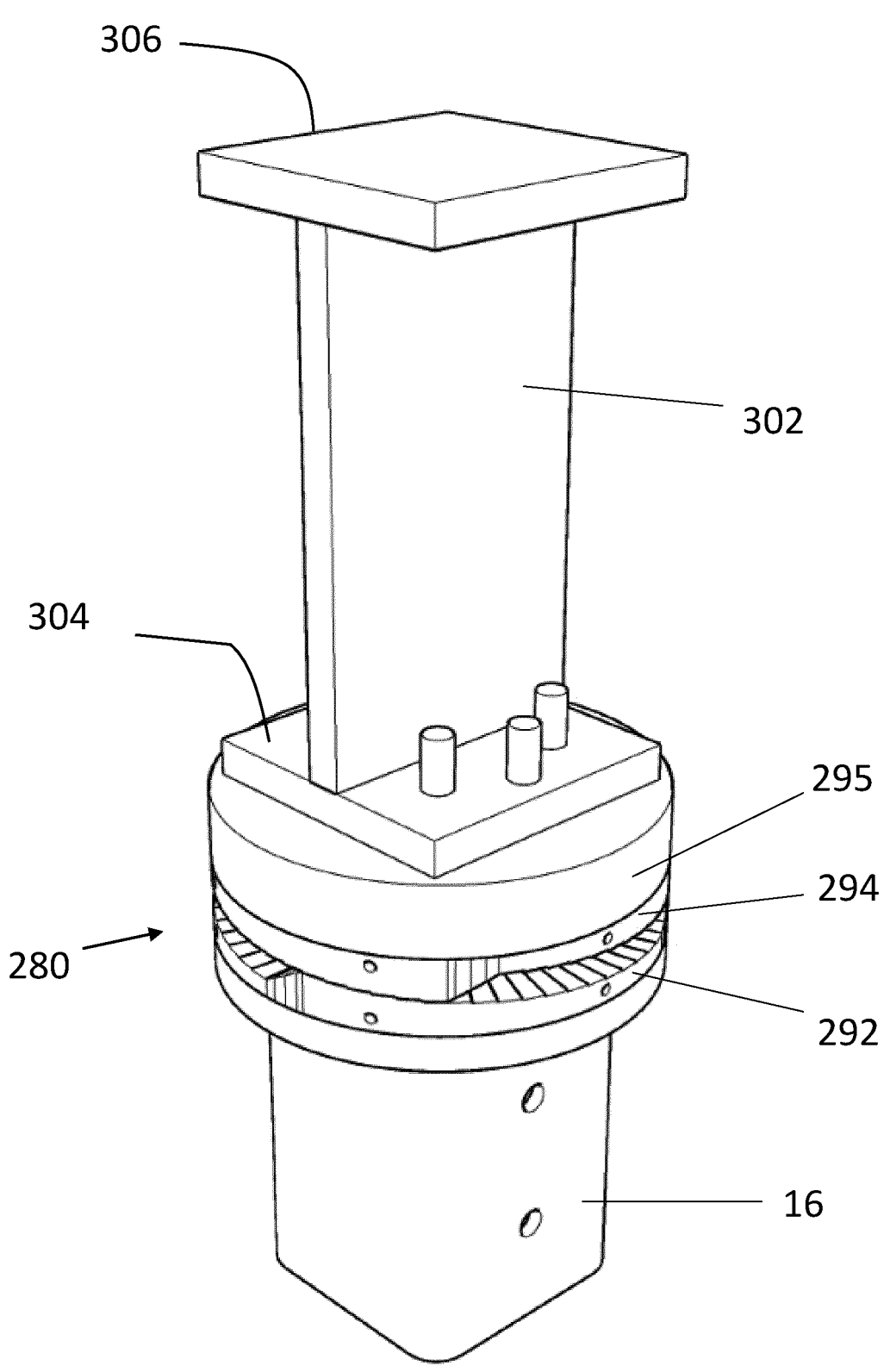
FIG. 23 is a perspective view of an adjustable grid levelling mechanism interposed in a splice joint of the vertical upright according to a third embodiment of the present invention.

Instead of the grid members being mounted directly on the adjustable grid levelling mechanism 280, a spacer 302 can be incorporated between the adjustable grid levelling mechanism 280 and the grid structure. In the particular embodiment shown in FIG. 23, the spacer 302 is shown interposed between the adjustable grid levelling mechanism 280 at the upper end of the vertical upright and the grid structure. The spacer 302 is shown bolted to one side of the adjustable grid levelling mechanism 280 at a lower end 304 of the spacer 302. The mounting head, e.g. cap plate, is fixed to an upper end 306 of the spacer 302. Variation of the height of the adjustable grid levelling mechanism causes movement of the spacer 302 and the mounting head mounted thereon in a vertical direction.

In yet another example of the present invention, the adjustable grid levelling mechanism can be incorporated into a spliced joint (not shown) provided in a vertical upright. A portion of a vertical upright can be spliced to provide end to end members. At least one spliced joint can be incorporated into one or more vertical uprights. Interposed between the spliced joints is the adjustable grid levelling mechanism of the present invention. The adjustable grid levelling mechanism is interposed between the end to end members of the splice joint. The adjustable grid levelling mechanism can be any of the different embodiments of the adjustable grid levelling mechanisms discussed above. For example, where the adjustable grid levelling mechanism comprises a pair of mating washers discussed above, the pair of mating washers can be interposed between the ends of the spliced joint such that rotation of at least one of the locking washers extends the length, and thus height of a vertical upright.

In all of the embodiments of the present invention, the lower end of one or more of the vertical uprights in a grid framework structure is anchored to a floor, e.g. a concrete foundation, by an anchor foot. The anchor foot is secured to the flooring by one or more anchor bolts. Various types of anchor feet to rigidly anchor the vertical uprights to the floor are applicable in the present invention. The anchor foot functions to bear the vertical upright and any bracing load of the vertical uprights. An example of an anchor foot 400 is shown in FIGS. 16, 19 and 20 and is an example where the anchor foot 400 has been topology optimised within given physical constraints based on the load experienced at the base of the vertical upright. In the particular embodiment of the present invention shown in FIGS. 16, 21 and 22. The anchor foot 400 has four anchor points 402 for bolting the anchor foot 400 to the floor or a concrete foundation, and an opening 404 for receiving the lower end of a vertical upright 16 whereupon the lower end of the vertical upright 16 is inserted into the opening 404. The lower end of the vertical upright is secured to the anchor foot by an additional two bolts 406.

The anchor foot can be made extendible so that it can be extended or retracted to adjust the height of the anchor foot. The adjustable grid levelling mechanism interposed between the grid structure and the upper end of the vertical upright can be used in conjunction to the anchor foot at the lower end of the vertical upright for adjusting the level of the grid structure. For example, the anchor foot 400 can comprise an extendible portion (not shown) whereby the extendible portion of the anchor foot can be configured to provide coarse levelling adjustments at the foot of one or more vertical uprights. Since, the level of the grid structure varies over time due to the unevenness of the ground, finer adjustments or tuning of the grid level can then be made to the adjustable grid levelling mechanism of the present invention at the grid structure to compensate for this unevenness. The converse is equally applicable whereby the extendible portion of the anchor foot provides the finer adjustments to the grid level and the adjustable grid levelling mechanism at the grid structure provides the coarser grid level adjustments.

The invention claimed is:

1. A grid framework structure configured to support one or more load handling devices thereupon, said grid framework structure comprising:
   i) a grid structure including a first set of grid members extending in a first direction and a second set of grid members extending in a second direction, the second set of grid members running transversely to the first set of grid members in a substantially horizontal plane in a grid pattern containing a plurality of grid cells, each of the plurality of grid cells has an opening to enable a load handling device to lift a container or storage bin through the grid cell;
   ii) a plurality of vertical uprights for supporting the grid structure; the plurality of vertical uprights are configured and arranged to form a plurality of vertical storage locations for one or more containers to be stacked between the vertical uprights, each of the vertical uprights comprises a plurality of corners and one or more guides mounted to or formed at each corner, the one or more guides extending along a longitudinal length of each vertical upright for guiding movement of the containers or storage bins along a respective vertical storage location, wherein the plurality of vertical uprights are interconnected at upper ends thereof by the first set of grid members and the second set of grid members; and
   iii) an adjustable grid levelling mechanism for adjusting a level of the grid structure, wherein the grid structure is mounted to the adjustable grid levelling mechanism at one or more of the interconnections of the plurality of vertical uprights such that the adjustable grid levelling mechanism is interposed between at least one of the plurality of vertical uprights and the grid structure for adjusting a vertical distance between the at least one of the plurality of vertical uprights and the grid structure;
   wherein the adjustable grid levelling mechanism comprises:
   a base supported or received by the at least one vertical upright;
   a mounting head supporting the grid structure; and
   an extendible section interposed between the base and the mounting head and configured to selectively vary a vertical distance between the base and the mounting head such that the level of the grid structure relative to the at least one vertical upright is adjustable.

2. The grid framework structure of claim 1, wherein the base comprises:
   an insert receivable in an upper end of a vertical upright.

3. The grid framework structure of claim 2, wherein the extendible section comprises:
   a threaded shaft configured to be extended or retracted relative to the base.

4. The grid framework structure of claim 3, wherein the mounting head is mounted to the threaded shaft that threadingly engages with the base such that the threaded shaft is configured to be extended or retracted relative to the base.

5. The grid framework structure of claim 1, wherein the extendible section comprises:
   a pair of mating washers having opposing or mating faces, the opposing or mating faces of each of the pair of mating washers having a profile or contour with a variable height extending in a circumferential direction such that rotation of the at least one of the pair of mating washers relative to the other will cause a height of the pair of the mating washers to be adjusted.

6. The grid framework structure of claim 5, wherein the at least one of the pair of mating washers is configured to rotate about a longitudinal axis of the vertical upright.

7. The grid framework structure of claim 5, wherein the profile or contour of the mating face of each of the pair of mating washers comprises:
   at least one wedge shaped face.

8. The grid framework structure of claim 5, wherein the mating faces of the pair of mating washers comprise:

indexing means or an indexing mechanism configured to cause rotation of at least one mating washer relative to the other mating washer to be indexed.

9. The grid framework structure of claim 8, wherein the indexing means or an indexing mechanism comprises:

a plurality of teeth configured such that rotation of at least one mating washer relative to the other mating washer will be locked at a desired rotational angle.

10. The grid framework structure of claim 5, wherein the base comprises:

a seat configured for seating the pair of mating washers.

11. The grid framework structure of claim 10, wherein the seat comprises:

a post configured and arranged to receive the pair of mating washers.

12. The grid framework structure of claim 1, wherein the mounting head comprises:

a spigot receivable in a seat.

13. The grid framework structure of claim 1, wherein the mounting head comprises:

at least two perpendicular ends, each of the two perpendicular ends being configured for connecting to at least one of the first set of grid members extending in the first direction and at least one of the second set of grid members extending in the second direction.

14. The grid framework structure of claim 1, wherein a lower end of each of the plurality of vertical uprights is anchored to a concrete foundation by an anchor foot.

15. The grid framework structure of claim 1, wherein the first set of grid members comprises:

a first set of tracks; and the second set of grid members comprises:

a second set of tracks.

16. The grid framework structure of claim 15, wherein the first set of grid members comprises:

a first set of track supports; and the second set of grid members comprises:

a second set of track supports.

17. The grid framework structure of claim 1, wherein the plurality of vertical uprights comprise a hollow section, and wherein the hollow section is configured to receive the base of the adjustable grid levelling mechanism.

\* \* \* \* \*